(12) United States Patent
Zhang et al.

(10) Patent No.: US 11,967,747 B2
(45) Date of Patent: Apr. 23, 2024

(54) REDOX FLOW BATTERY ELECTROLYTES WITH 2,5-DIMERCAPTO-1,3,4-THIADIAZOLE (DMTD) AND ITS DERIVATIVES

(71) Applicants: The Lubrizol Corporation, Wickliffe, OH (US); The Ohio State Innovation Foundation, Columbus, OH (US)

(72) Inventors: Shiyu Zhang, Columbus, OH (US); Paul E. Adams, Willoughby, OH (US); Shelby Davis, Columbus, OH (US); Christopher Michael Rasik, Cleveland, OH (US); Madison Tuttle, Columbus, OH (US)

(73) Assignees: The Lubrizol Corporation, Wickliffe, OH (US); Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/642,975

(22) PCT Filed: Sep. 14, 2020

(86) PCT No.: PCT/US2020/050686
§ 371 (c)(1),
(2) Date: Mar. 15, 2022

(87) PCT Pub. No.: WO2021/055275
PCT Pub. Date: Mar. 25, 2021

(65) Prior Publication Data
US 2022/0320561 A1 Oct. 6, 2022

Related U.S. Application Data

(60) Provisional application No. 62/901,307, filed on Sep. 17, 2019.

(51) Int. Cl.
*H01M 8/18* (2006.01)
*H01M 8/02* (2016.01)
*H01M 8/0239* (2016.01)
*H01M 8/08* (2016.01)

(52) U.S. Cl.
CPC ............. *H01M 8/188* (2013.01); *H01M 8/02* (2013.01); *H01M 8/0239* (2013.01); *H01M 8/08* (2013.01); *H01M 2300/0002* (2013.01); *H01M 2300/0028* (2013.01)

(58) Field of Classification Search
CPC .......... H01M 8/18; H01M 8/188; H01M 8/02; H01M 8/0239; H01M 8/08
See application file for complete search history.

(56) References Cited

U.S. PATENT DOCUMENTS

| | | |
|---|---|---|
| 4,772,546 A | 9/1988 | Deguchi et al. |
| 5,414,090 A | 5/1995 | Love et al. |
| 6,340,539 B1 | 1/2002 | Yamaguchi et al. |
| 2002/0058594 A1 | 5/2002 | Karol et al. |
| 2006/0168741 A1* | 8/2006 | Laufer ............... C07D 285/125 8/411 |
| 2009/0156444 A1 | 6/2009 | Aguilar et al. |
| 2018/0097248 A1 | 4/2018 | Nariyama et al. |
| 2019/0020031 A1 | 1/2019 | Otsuka |
| 2019/0036142 A1* | 1/2019 | Treger ............ C08J 5/225 |

FOREIGN PATENT DOCUMENTS

| | | |
|---|---|---|
| JP | 2013234126 A | 11/2013 |
| WO | 01/29155 A2 | 4/2001 |
| WO | 01/29156 A2 | 4/2001 |
| WO | 2015048550 A1 | 4/2015 |

* cited by examiner

*Primary Examiner* — Karie O'Neill Apicella
(74) *Attorney, Agent, or Firm* — Christopher P. Demas; Michael A. Miller

(57) ABSTRACT

The disclosed technology relates to redox flow batteries ("RFB"), and particularly to electrolytes useful in RFBs based on 2,5-dimercapto-1,3,4-thiadiazole ("DMTD") and derivatives thereof.

14 Claims, No Drawings

REDOX FLOW BATTERY ELECTROLYTES WITH 2,5-DIMERCAPTO-1,3,4-THIADIAZOLE (DMTD) AND ITS DERIVATIVES

CROSS REFERENCE TO RELATED APPLICATION

This application claims priority from PCT Application No. PCT/US20/050686 filed on Sep. 14, 2020, which claims the benefit of U.S. Provisional Application No. 62/901,307 filed on Sep. 17, 2019, the entirety of which is hereby incorporated by reference.

BACKGROUND OF THE INVENTION

The disclosed technology relates to redox flow batteries ("RFB"), and particularly to electrolytes useful in RFBs based on 2,5-dimercapto-1,3,4-thiadiazole ("DMTD") and derivatives thereof.

Redox Flow Batteries ("RFB") are a promising new technology to harness renewable energy sources (e.g., solar, wind) in future large-scale stationary energy storage applications. Although current commercial RFBs use electrolytes based upon vanadium metal dissolved in strong mineral acids, key players in this industry will eventually prefer to use heavy metal-free electrolytes composed of non-corrosive and non-toxic organic compounds. Therefore, sustainable low-cost organic-based RFB electrolytes with highly reversible redox properties and high specific energy retention after many cycles would be of great interest for this nascent and developing industry.

Examples of electrolyte organic chemistry in the art usually start with some or all of relatively expensive starting materials and reagents, may need multiple steps to obtain the target final product, generate large quantities of undesirable process wastes, and could also require tedious purification steps.

The use of organic redox compounds in an RFB electrolyte are known. For example, G. Yu; Chem. Soc. Rev, 47, p69-103 (2018): *Molecular engineering of organic electroactive materials for redox flow batteries* provides a general teaching on the state of the art for organic RFB materials. U.S. Pat. No. 9,812,883B1, granted Nov. 7, 2017 to Brushett teaches RFB electrolytes containing quinoxaline moieties, U.S. 2016/0248114, published Aug. 25, 2016 and U.S. 2016/0043423, published Feb. 11, 2016, both to Huskinson, teaches RFB electrolytes containing quinone or hydroquinone moieties, and US 2018/0331363, published Nov. 15, 2018 to Winsberg teaches RFB electrolytes containing 2,2,6,6-tetramethylpiperidinyloxyl moieties.

DMTD derivatives have been used before in electrochemical methods. For example, U.S. Pat. No. 6,340,539, granted Jan. 22, 2002 to Yamaguchi teaches DMTD dilithium dihydrate salts for use as a positive electrode material in lithium ion batteries. Similarly, T. Sotomura, et. al. Nature 373, p598 (1995): *Dimercaptan-Polyaniline Composite Electrodes for Li Batteries with High Energy,* teaches the use of dimercaptan-polyaniline composite electrodes for lithium batteries. J. Lee: Electrochimica Acta 286 (2018) *A Non-Absorbing Organic Redox Couple for Sensitization-Based Solar Cells with Metal-Free Counter Electrode* teaches the use of a 5-methylthio-1,3,4-thiadiazole-2-thiol and its oxidized dimer as a redox couple in sensitization-based solar cells that could be a potential alternative to silicon-based photovoltaics.

However, the starting materials for these compositions are either not readily available, are expensive, do not provide the requisite reversibility for RFB application, or the processes of production are difficult and result in unfavorable waste. Likewise, none of the foregoing teach or suggest the use of DMTD or its derivatives as a redox compound for an RFB electrolyte. Thus, there is a need for organic compounds with reversible redox behaviors that are inexpensive and easy to produce to push the RFB space forward.

SUMMARY OF THE INVENTION

The disclosed technology, therefore, solves the problem of difficult to produce and expensive but readily oxidizable organic chemistry by providing an electrolyte containing DMTD or its derivatives for an RFB battery. Further, the technology provides DMTD derivatives that can be tuned to be soluble in a selected medium, especially an aqueous medium, where DMTD itself and some of its derivatives on their own are not soluble, while providing a compound with the desired redox potential.

In one embodiment, there is provided a redox flow battery electrolyte that includes A) a polar solvent, and B) DMTD or a derivative thereof.

The polar solvent in the aforementioned electrolyte can be, for example, water. The polar solvent can also be, for example acetonitrile. In some embodiments, the polar solvent can be an organic solvent, such as a carbonate, ether, and/or a glycol.

The DMTD derivatives can include mono-alkylated DMTD compounds. Such mono-alkylated DMTD compounds can be prepared, for example, from a simple alkylation process with DMTD and an alkyl halide, and optionally a base and/or an oxidizing reagent, such as hydrogen peroxide.

The DMTD derivatives can also include etherified DMTD compounds. Such etherified DMTD compounds can be prepared, for example, from a simple alkylation process with DMTD and an ether halide, and optionally a base and/or an oxidizing reagent, such as hydrogen peroxide.

The DMTD derivatives can include mono-alcohol DMTD compounds. Such mono-alkylated DMTD compounds can be prepared, for example, from a simple alkylation process with DMTD and an alcohol halide, or an epoxidation with an epoxide, and optionally a base and/or an oxidizing reagent, such as hydrogen peroxide.

The DMTD derivatives also include DMTD substituted esters or amides. Such DMTD substituted esters and amides can be prepared, for example, via Michael-like conjugate additions to, for example, activated olefin-containing carboxylates or carboxamides, which can afford high conversion and little to no process waste. Such esters and amides optionally can be further reacted with a base and/or an oxidizing reagent, such as hydrogen peroxide.

The DMTD derivatives also include water-soluble esters or amides of DMTD. Such water-soluble esters or amides of DMTD can be obtained, for example, by adding DMTD to an activated reagent that contains a quaternary nitrogen-halide group and optionally a base and/or an oxidizing reagent, such as hydrogen peroxide.

The DMTD derivatives also include zwitterionic DMTD esters or amides. Such zwitterionic DMTD esters or amides can be prepared, for example, by treating the water-soluble esters or amides of DMTD with a strong base.

The DMTD, or derivative thereof, can be included in the electrolyte at from about 1 to about 50 wt. %.

The electrolyte can also include a supporting electrolyte to help make the electrolyte solution conductive, which supporting electrolyte may be present at from about 0.1 to about 20 wt. %. Supporting electrolytes currently envisaged can include, but are not limited to, lithium salts, sodium salts, potassium salts, and mixtures thereof.

Also provided is a redox flow battery system including the above discussed electrolyte. In the battery system, the electrolyte will, during a charging state, form A) an anolyte comprising DSSD, 2DS⁻, or a mixture thereof in a polar solvent, and B) a catholyte comprising DSSD or 2S⁻, or a mixture thereof in a polar solvent.

The redox flow battery system can include an ion exchange membrane or microporous membrane through which the electrolyte can readily flow. Current membrane envisaged for the RFB system include, but are not limited to, sulfonated tetrafluouroethylene based fluoropolymer-copolymer membranes, for example, cellulose-based dialysis membranes, and membranes of functionalized polystyrene blended with polyvinyl chloride.

DETAILED DESCRIPTION OF THE INVENTION

Various preferred features and embodiments will be described below by way of non-limiting illustration.

The present technology includes an electrolyte useful in redox flow batteries ("RFB"). The electrolyte includes A) a polar solvent, and B) 2,5-Dimercapto-1,3,4-thiadiazole ("DMTD") or derivatives thereof.

The polar solvent can be any solvent in which the DMTD or derivative thereof is soluble in in both its oxidized and reduced states. The solvent should also remain inert within the working conditions of the RFB. It is expected that those of ordinary skill can readily determine the solubility and inertness of, and therefore choose, the appropriate solvent. The simplest solvent for the present technology could be water. The polar solvent can also be, for example, an alcohol, such as $C_1$ to $C_{10}$ alcohol or glycol, including, for example, methanol, ethanol, 1-propanol, 2-propanol, ethylene glycol, propylene glycol. Ethers may also be employed as the solvent, including, for example, dimethoxymethane, methoxybenzene (anisole), tetrahydrofuran (THF), 2-methyltetrahydrofuran, 1,4-dioxane, 1,3-dioxolane (DOL), 4-methyl-1,3-dioxolane, 1,2-dimethoxyethane (DME), and bis(2-methoxyethyl) ether (diglyme). The polar solvent can also be a ketone, such as acetone or acetylacetone. Nitriles, such as, for example, acetonitrile (CAN), methoxyacetonitrile, propionitrile, butyronitrile, isobutyronitrile, benzonitrile, and 3-methoxypropionitrile can be employed as the solvent, as can amines, such as ethylenediamine and pyridines, or amides such as formamide, n-methylacetamide, N,N-dimethylformamide (DMF), N,N-dimethylacetamide (DMA), and N-methyl-2-pyrrolidinone (NMP). The solvent can also be a carbonate. Non-limiting examples of carbonates include propylene carbonate (PC), ethylene carbonate (EC), γ-butyrolactone (γ-BL), γ-valerolactone (γ-VL), dimethyl carbonate (DMC), diethyl carbonate (DEC), ethyl methyl carbonate (EMC), and 1,2-butylene carbonate. Other organic based solvents are also contemplated, such as, for example, hexane, benzene, toluene, nitromethane, nitrobenzene, 1,2-dichloroethane, dimethyl sulfoxide (DMSO), ethyl acetate, and nitroethane to name a few. The solvent may also employ a combination of any of the foregoing solvents.

The electrolyte can include DMTD on its own, a DMTD derivative on its own, or combinations thereof. DMTD derivatives can include, for example mono-alkylated DMTD compounds, DMTD ethers, DMTD esters, DMTD amides, DMTD alcohols, and zwitterionic DMTD esters, amides and alcohols. The derivatives can be provided as pure compounds, but most often occur as a mixture of compounds.

The DMTD derivatives include reaction products of DMTD and other chemical reagents via a variety of different chemical reactions. These reactions include acid-based reactions, displacements using electron deficient hydrocarbons, 1,4-additions to olefins, disulfide formation, and epoxide opening reactions. These reactions can be performed in the presence of wide array of functional groups that can provide for desired solubility and electrochemical performance. These functional groups include carbonyl-containing molecules, heteroatom-containing molecules (nitrogen, oxygen, sulfur), inorganic atoms, and unsaturation.

The DMTD derivatives can thus be the reaction product, for example, of DMTD and a halogenated alkyl or aryl "group" and optionally a base and/or an oxidizing reagent. The DMTD derivatives can also be the reaction product of DMTD and a halogenated ether ("halo-ether") group (which include simple ethers as well as polyethers) and optionally a base and/or an oxidizing reagent. The DMTD derivatives can also be the reaction product of DMTD and a carboxylate group and optionally a base and/or an oxidizing reagent. The DMTD derivatives can also be the reaction product of DMTD and a carboxamide group and optionally a base and/or an oxidizing reagent. The DMTD derivatives can also be the reaction product of DMTD and a halogenated alcohol ("halo-alcohol") group or epoxide group and optionally a base and/or an oxidizing reagent.

As used herein, the term "group," for example as in a halogenated alkyl or aryl group, halo-ether group, halo-alcohol group, (meth)acrylate group, and (meth)acrylamide group, depending on the context, refers to the structure of the stated group on its own or as the structure in which the group would form after reaction with another compound. For example, a methyl group could be $CH_4$, as in its lone state, or —$CH_3$ as in its bonded form, or, as a further example, methyl acrylate, could refer to $CH_2=CHC(O)OCH_3$, as in its lone state, or —$CH_2CHC(O)OCH_3$, as in its bonded form.

As used herein, the parentheses "( )" around the term "meth" means the term "meth" may or may not be present. Thus, (meth)acrylate can refer to both acrylate and methacrylate, and (meth)acrylamide includes both acrylamide and methacrylamide.

In general, the DMTD derivatives can be represented by formula I:

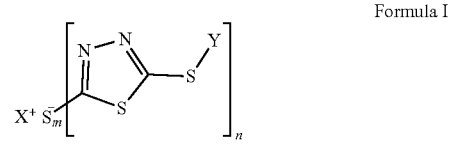

Formula I where
each "X," individually, is an alkali or alkaline earth metal, such as Li, Na, K, Mg, or Ca, a trialkyl amine, or a quaternary amine (including for purposes of this disclosure, ammonia), or H;
"m" is 1, 2 or 3, and "n" is 1 or 2; and
where "Y" is:
"R," a linear, branched, saturated or unsaturated, or cyclic $C_1$ to $C_{12}$, or $C_1$ to $C_{10}$, or $C_1$ to $C_8$, or even $C_1$ to $C_6$ alkyl or aryl group, or H;

"[RO]$_o$R," where "o" is an integer from 1 to 100;

"R[OH]$_p$A," where "p" is an integer from 1 to 6 and "A" is H or an amine, such as a trialkyl amine or a quaternary amine salt; or a carboxylate or carboxamide group, such as, for example, an itaconate, maleate, or for example, a (meth)acrylate or (meth)acrylamide which would form "CH$_2$CH[CH$_3$ or H]C(O)[O or NH]Z," where "Z" can be H, X, "R," RN$^+$(R)$_3$SO$_3^-$, RN$^+$(R)$_3$SO$_3^-$K$^+$, "RSO$_3^-$Na$^+$," RSO$_3^-$NH$_4^+$, "RSO$_3$H," or "RN$^+$(R)$_3$Cl$^-$."

In preparing the DMTD derivatives, a base may be employed. Such a base may be, for example, an alkaline or alkaline earth metal hydroxide or carbonate, an amine, such as, for example a trialkyl amine or a quaternary amine. In addition, a strong base may be employed after the derivative is prepared to cause deprotonation of the un-substituted sulfur atom. In either case, if a base is employed, "X" in Formulas I can be an alkali or alkaline earth metal such as Li, Na, K, Mg, or Ca, a trialkyl amine, or a quaternary amine. If a base is not employed, "X" would be H and the positive and negative charges associated therewith would be absent.

Formula I may be coupled or un-coupled through the un-substituted sulfur atom, i.e., "S$^-_m$." In the case that the DMTD derivative is not sulfur coupled, "n" in Formula 1 would be 1 and "m" would be 1, as shown in Formula II below.

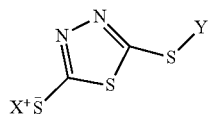

Formula II

In the case were the DMTD derivative is sulfur coupled, "n" in Formula I would be 2, "m" could be 1, 2 or 3, and "X" and the positive and negative charges associated therewith would be absent. Such a coupled DMTD derivative can be prepared by preparing the un-coupled compound and then introducing an oxidizing reagent, such as hydrogen peroxide or others as would be known by those of ordinary skill in the art. Examples of coupled DMTD derivative are shown in Formulas III, IV and V below.

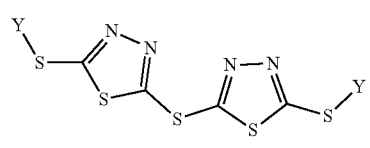

Formula III

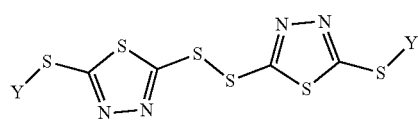

Formula IV

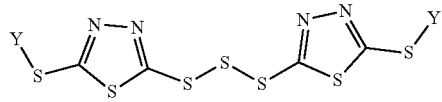

Formula V

The substituent Y of the DMTD derivatives of foregoing formulas can come from a linear, branched, saturated or unsaturated, or cyclic alkyl group, or aryl group (an unsaturated alkyl group is synonymous with alkene). In such an embodiment, DMTD can be alkylated or arylated with an alkyl or aryl halide to give a mono-alkylated DMTD derivative, and then optionally salted with one equivalent of a base (i.e., an alkali or alkaline earth metal or amine which will provide the "X"). Although the substituent may be a saturated alkyl group or an aryl group, the derivative is collectively referred to herein and in the claims as a "mono-alkylated" DMTD derivative. Such mono-alkylated DMTD derivatives may be a mixture of sulfured coupled and non-coupled species as described above. The mono-alkylated DMTD derivatives may be represented by formula VI:

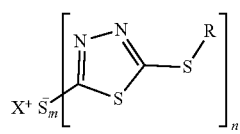

Formula VI where X, m, and n are as set forth for Formula I, and R is a linear, branched, saturated or unsaturated, cyclic C$_1$ to C$_{12}$, or C$_1$ to C$_{10}$, or C$_1$ to C$_8$, or even C$_1$ to C$_6$ alkyl or aryl group; or H.

Examples of the R group can include methyl, ethyl, propyl, butyl, pentyl, hexyl, heptyl, octyl, nonyl, decyl, undecyl, and dodecyl groups, including branched versions thereof, such as, for example, isobutyl, ethylhexyl, isoamyl, and the like, as well as aromatic groups (e.g. benzyl) or cyclic groups (e.g., cyclohexyl).

In some embodiments, DMTD can be reacted with a benzylhalide, and optionally a base and/or oxidizing reagent, to provide a mono-arylated DMTD derivative of one or more of formula VI(1), (2), (3), or (4).

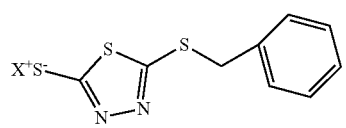

VI(1)

VI(2)

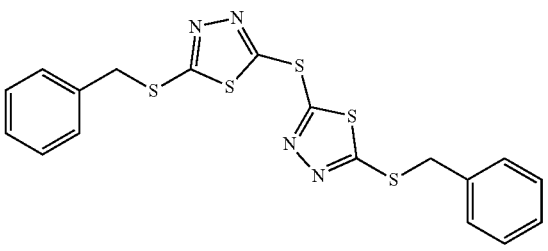

VI(3)

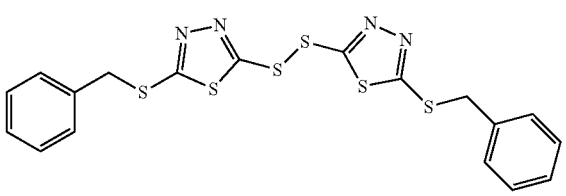

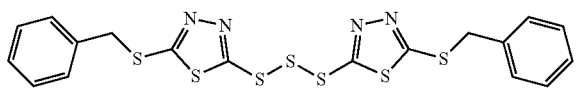
VI(4)

The substituent Y of the DMTD derivatives of Formula I can come from an ether group. In such an embodiment, DMTD can be etherified with a halo-ether to give a mono-ether DMTD derivative, and then optionally salted with one equivalent of a base (i.e., an alkali or alkaline earth metal or amine which will provide the "X"). Such mono-ether DMTD derivatives may be a mixture of sulfured coupled and non-coupled species as described above. The mono-ether DMTD derivatives may be represented by formula VII:

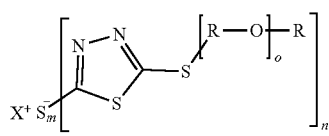
Formula VII where X, R, m, and n are as set forth for Formula I, and "o" is an integer from 1 to 100, or 1 to 75, or 1 to 50, or 1 to 25, or 1 to 20, or 1 to 15, or 1 to 10, or 2 to 10 or 4 to 10 or 6 to 10.

Example simple ethers (i.e., the $[RO]_oR$ group where o is 1) that may be employed include dimethyl ether (both R's are methyl groups, o is 1), diethyl ether (both R's are ethyl groups, o is 1), dipropyl ether (both R's are propyl groups, o is 1), methyl ethyl ether (one R is a methyl group, one R is an ethyl group, o is 1), methyl phenyl ether (one R is a methyl group, one R is n phenyl group, o is 1).

Example polyethers (i.e., the $[RO]_oR$ group where o is 2 to 100) that may be employed include paraformaldehyde (i.e., the $[RO]_oR$ group where the repeating R is a methyl group and the non-repeating R is H, o is 8 to 100), polyethylene glycol (i.e., the $[RO]_oR$ group where the repeating R is an ethyl group and the non-repeating R is H, o is 2 to 100), polypropylene glycol (i.e., the $[RO]_oR$ group where the repeating R is an iso-propyl group and the non-repeating R is H, o is 2 to 100), polytetrahydrofuran (i.e., the $[RO]_oR$ group where the repeating R is a butyl group and the non-repeating R is H, o is 2 to 100).

In some embodiments, DMTD can be reacted with a halomethyl ether, and optionally a base and/or oxidizing reagent, to provide a mono-ether DMTD derivative of one or more of formula VII(1), (2), (3), or (4).

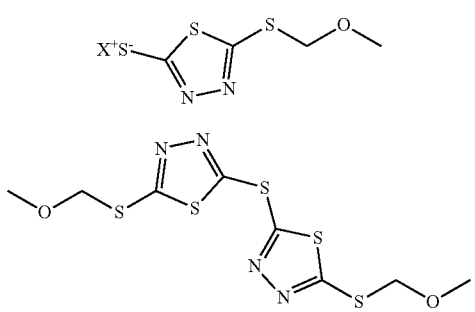
VII(1)

VII(2)

VII(3)

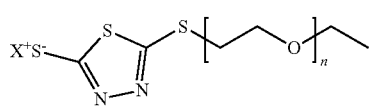

VII(4)

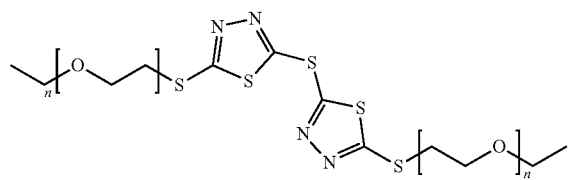

In some embodiments, DMTD can be reacted with a polyethylene glycol halide, and optionally a base and/or oxidizing reagent, to provide a mono-ether DMTD derivative of one or more of formula VII(5), (6), (7), or (8):

VII(5)

VII(6)

VII(7)

VII(8)

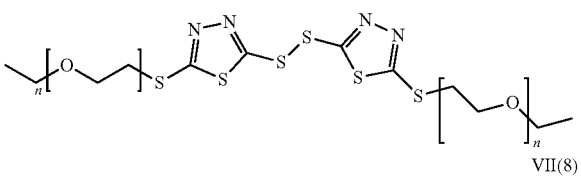

The substituent Y of the DMTD derivatives of Formula I can also come from a halo-alcohol or epoxide group. In such an embodiment, DMTD can be reacted with a halo-alcohol or epoxide to give a mono-alcohol DMTD derivative, and then optionally salted with one equivalent of a base (i.e., an alkali or alkaline earth metal or amine which will provide the "X"). Such mono-alcohol DMTD derivatives may be a mixture of sulfured coupled and non-coupled species as described above. The mono-alcohol DMTD derivatives may be represented by formula VIII:

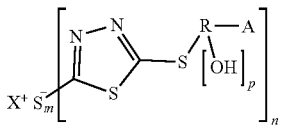
Formula VIII where X, R, m, and n are as set forth for Formula I, and "p" is an integer from 1 to 6 and "A" is H or an amine, such as a trialkyl amine or a quaternary amine salt.

Example mono-alcohols (i.e., the R[OH]$_p$A group where p is 1 and A is H) include propanol (i.e., R is a linear or branched propyl group) which would be obtained, for example, from a halogenated propanol, such as chloropropanol or propylene oxide; hexanol (i.e., R is a linear or branched hexyl group) which would be obtained, for example, from a halogenated hexanol, such as chlorohexanol; butanol (i.e., R is a linear or branched butyl group) which would be obtained, for example, from a halogenated butanol, such as chlorobutanol or butylene oxide; phenyl propanol (i.e., R is propyl or ethylbenzene) which would be obtained, for example, from a halogenated phenyl propanol group, such as chlorophenylethanol or styrene oxide.

Example polyols (i.e., the R[OH]$_p$A group where p is 2 to 6 and A is H) that may be employed include sugar alcohols, polyvinyl alcohols, ethylene glycol (i.e., R is an ethyl group, p is 2), propylene glycol (i.e., R is a linear or branched propyl group, p is 2), butanediol (i.e., R is a linear or branched butyl group, p is 2), glycerol (i.e., R is a butyl group, p is 3).

Example alcohol amines (i.e., the R[OH]$_p$A group where A is an amine) that may be employed include ethanolamine (i.e., R is an ethyl group, p is 1, A is NH$_2$), propanolamine (i.e., R is a propyl group, p is 1, A is NH$_2$), propanol dimethylamine (i.e., R is a propyl group, p is 1, A is N(CH$_3$)$_2$), propanol quaternary amine halide salt (i.e., R is a propyl group, p is 1, A is a N$^+$(CH$_3$)$_3$·Cl$^-$).

In some embodiments, DMTD can be reacted with a glycidol, and optionally a base and/or oxidizing reagent, to provide a mono-alcohol derivative of one or more of formula VIII(1), (2), (3), or (4).

VIII(1)

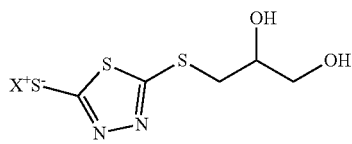

VIII(2)

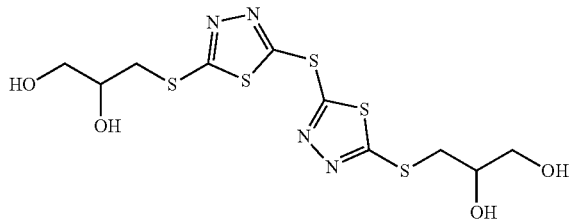

VIII(3)

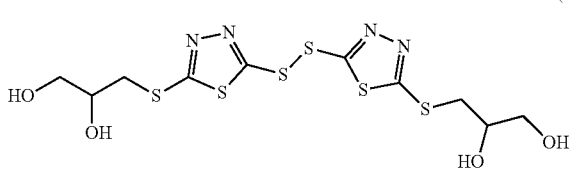

VIII(4)

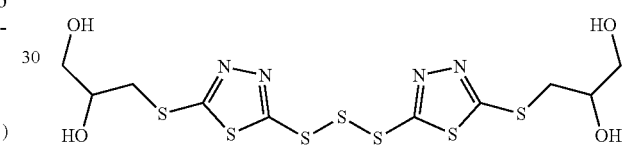

In some embodiments, DMTD can be reacted with a glycidol methacrylate, and optionally a base and/or oxidizing reagent, to provide a mono-alcohol derivative of one or more of formula VIII(5), (6), (7), or (8).

VIII(5)

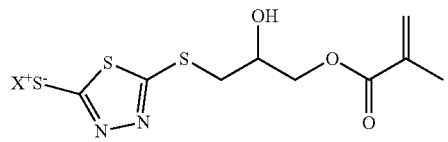

VIII(6)

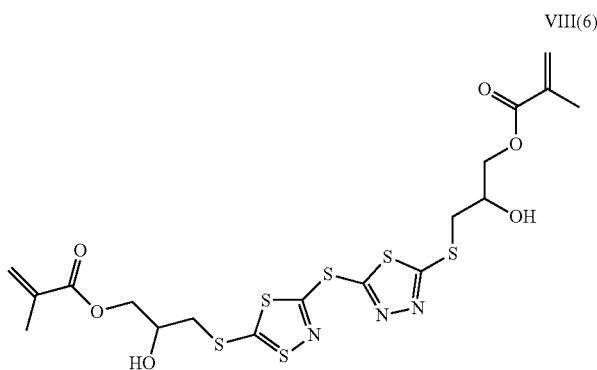

VIII(7)

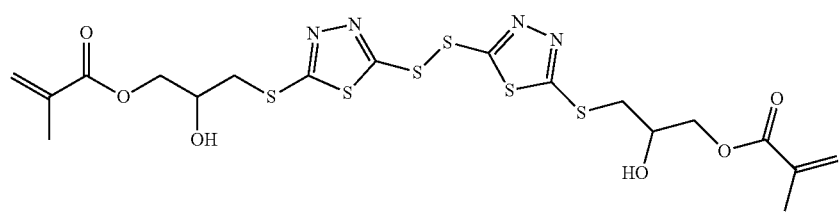

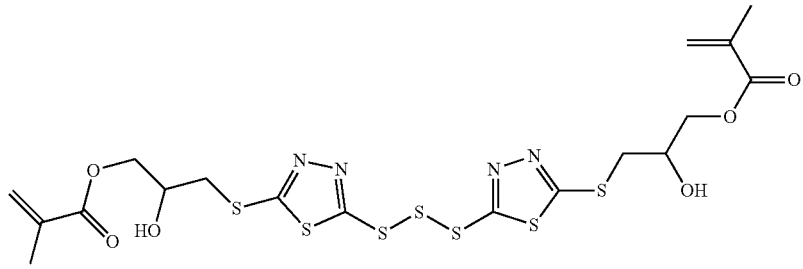

VIII(8)

In some embodiments, DMTD can be reacted with a 2-epoxy quaternary ethyl amine halide, and optionally a base and/or oxidizing reagent, to provide a mono-alcohol derivative of one or more of formula VIII(9), (10), (11), or (12).

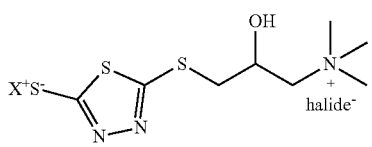

VIII(9)

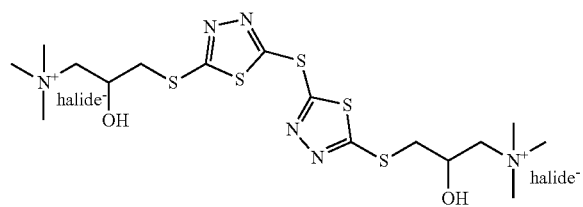

VIII(10)

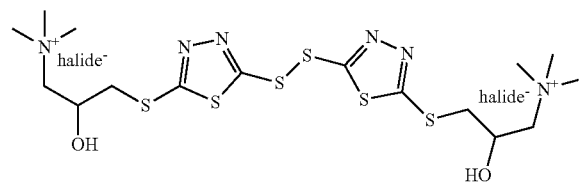

VIII(11)

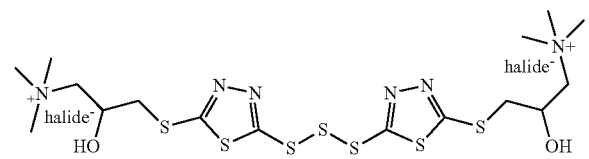

VIII(12)

In some embodiments, DMTD can be reacted in a Michael-like conjugate addition to an activated olefin-containing carboxylate or carboxamide to afford a substituted ester DMTD derivative and optionally salted with one equivalent of a base (i.e., an alkali or alkaline earth metal or amine which will provide the "X"). Such mono-carboxylate/carboxamide DMTD derivatives may be a mixture of sulfured coupled and non-coupled species as described above.

Carboxylate groups capable of 1,4 addition can be readily envisaged by those of skill in the art, and include, both mono-carboxylates and di-carboxylates as well as higher carboxylates, e.g., tricarboxylates, tetracarboxylates, etc. Example carboxylates can include, but not be limited to, itaconates, citraconates, maleates, fumarates, mesaconates, as well as (meth)acrylates. The carboxylates can be in the form of a salt with an alkali or alkaline earth metal, an ammonia group, or an ester with an "R" group. Where the salt is desired, it can be obtained by 1,4 addition of the salted monomer, or by addition of the ester followed by saponification with an alkali or alkaline earth metal hydroxide or ammonium hydroxide.

In general, the carboxylate containing DMTD derivatives can result from 1,4 addition between DMTD and a carboxylic acid or carboxylate. Where the 1,4 addition is with a carboxylic acid, the reaction will be followed by reaction with the desired base to form the salt. For example, DMTD may be reacted with aconitic acid to form a DMTD derivative with an aconitic acid connected off of a substituent sulfur, followed by reaction with an alkali metal hydroxide, alkali earth metal hydroxide, or ammonium hydroxide. Such a reaction could be represented, for example, by the following reaction mechanism:

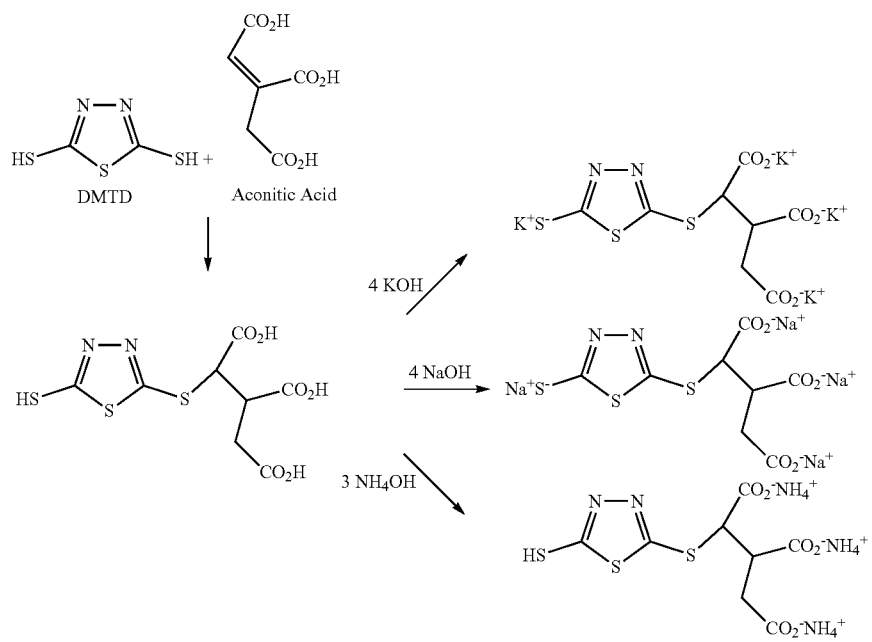

A further example could be a carboxylate containing DMTD derivative resulting from the 1,4 addition between DMTD and a dialkyl itaconate, such as dimethyl itaconate, wherein the substituent Y of the DMTD derivatives of Formula I would be dimethyl itaconate, for example, as represented by formula

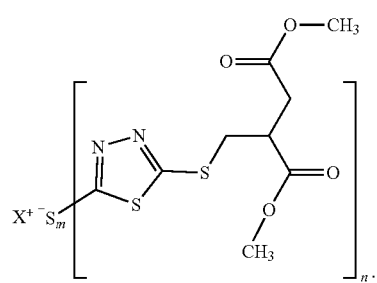

In the foregoing example, the carboxylate could also be, for example, a dialkali or dialkaline earth itaconate salt, such disodium itaconate, represented, for example, by formula

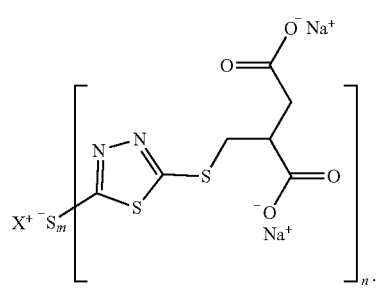

Another example carboxylate containing DMTD derivative can result from 1,4 addition between DMTD and a dialkyl maleate, such as dimethyl maleate, wherein the substituent Y of the DMTD derivatives of Formula I would be dimethyl maleate, for example, as represented by formula

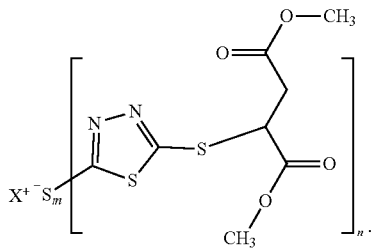

In the foregoing example, the carboxylate could also be, for example, a dialkali or dialkaline earth maleate salt, such disodium maleate, represented, for example, by formula

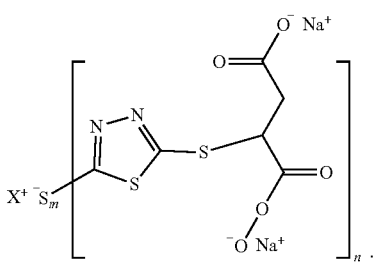

Further examples can include, for example, the reaction of methyl acrylate and DMTD, or dimethyl maleate and DMTD. Where the salts are desired, these examples can also include, for example, the reaction of sodium acrylate or disodium maleate, or the foregoing esters could be saponified in the presence of sodium hydroxide to obtain the salts.

Carboxamide groups capable of 1,4 addition can be readily envisaged by those of skill in the art, and include, both mono-carboxamides and di-carboxamides. Example carboxamides can include, but not be limited to, itaconic amide, citraconic amide, maleic amide, fumaric amide, mesaconic amide, as well as (meth)acrylamide. The carboxamides can be primary, or can be substituted with one or more "R" groups to form a secondary or tertiary amide group.

An aspect of the technology includes (meth)acrylate and (meth)acrylamide derivatives of DMTD. In an embodiment, the (meth)acrylate or (meth)acrylamide may include a quaternary ammonium group or sulfate group. In either case (acrylate or amide), the ester or amide derivative may be represented by formula

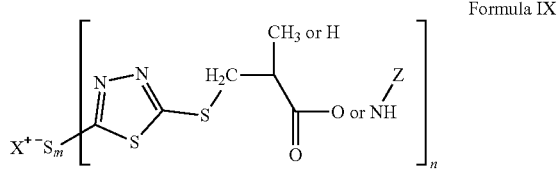

Formula IX where X, m, and n are as set forth for Formula I, and "Z" is H, X, "R," $RSO_3^-Na^+$, $RSO_3H$, $RN^+(R)_3SO_3^-$, $RN^+(R)_3SO_3^-K^+$, $RSO_3^-NH_4^+$ or $RN^+(R)_3Cl^-$.

In some embodiments, DMTD can be reacted with methyl acrylate to provide mono-acrylate DMTD derivative of Formula IX, in either coupled or un-coupled form, where Z is $CH_3$, m is 1, 2 or 3, n is 1 or 2 and X is an optional alkali or alkaline earth metal or amine.

In some embodiments, DMTD can be reacted with 2-ethylhexyl acrylate to provide a mono-acrylate DMTD derivative of Formula IX, in either coupled or un-coupled form, where Z is a 2-ethylhexyl group, m is 1, 2 or 3, n is 1 or 2 and X is an optional alkali or alkaline earth metal or amine.

In some embodiments, DMTD can be reacted with methacryloxyethyl trimethyl ammonium chloride to provide a mono-methacrylate DMTD derivative of Formula IX, in either coupled or un-coupled form, where Z is $(CH_2)_2N^+(CH_3)_3Cl^-$, m is 1, 2 or 3 and n is 1 or 2 and X is an optional alkali or alkaline earth metal or amine.

In some embodiments, DMTD can be reacted with methacrylaminopropyl trimethyl ammonium chloride to provide a mono-methacrylamide DMTD derivative of Formula IX, in either coupled or un-coupled form, where Z $(CH_2)_3N^+(CH_3)_3Cl^-$, m is 1, 2 or 3 and n is 1 or 2 and X is an optional alkali or alkaline earth metal or amine.

In some embodiments, DMTD can be reacted with 2-acrylamino-2-methylpropane sulfonic acid to provide a DMTD derivative of Formula IX, in either coupled or un-coupled form, where Z is $C(CH_3)_2CH_2SO_3H$, m is 1, 2 or 3 and n is 1 or 2 and X is an optional alkali or alkaline earth metal or amine.

In some embodiments, DMTD can be reacted with 2-acrylamino-2-methylpropane sulfonic acid sodium salt to provide a DMTD derivative of Formula IX, in either coupled or un-coupled form, where Z is $C(CH_3)_2CH_2SO_3^-Na^+$, m is 1, 2 or 3 and n is 1 or 2 and X is an optional alkali or alkaline earth metal or amine.

In some embodiments, DMTD ester or amide derivatives, such as those discussed above, may be treated with a strong base, such as LiOH, NaOH, KOH, $Ca(OH)_2$, a quaternary amine such as $R_4NOH$, and the like to produce a zwitterionic species as shown in formula X

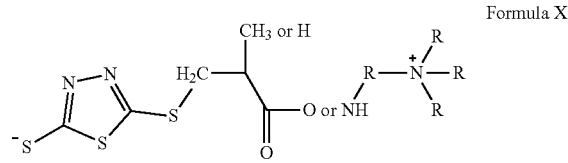

Formula X

For example, DMTD can be reacted with methacrylaminopropyl trimethyl ammonium chloride to provide a mono-methacrylamide DMTD derivative of Formula IX where Z $(CH_2)_3N^+(CH_3)_3Cl^-$, m is 1, 2 or 3 and n is 1 or 2, followed by treatment with NaOH to afford a zwitterion of formula X':

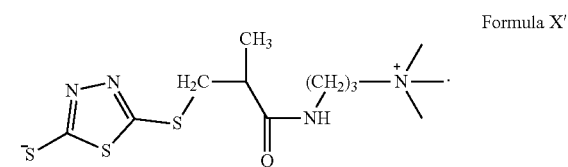

Formula X'

The DMTD, or derivative thereof, can be included in the electrolyte at from about 1 to about 50 wt. %, or in some instances, from about 2.5 to about 30 wt. %, or even from about 5 to about 25 wt. % or about 10 to about 20 wt. %.

The electrolyte can also include a supporting electrolyte, which may be present at from about 0.1 to about 20 wt. % of the electrolyte, or from about 0.25 to about 15 wt. %, or even from about 0.5 to about 10 wt. %. Such supporting electrolyte may be present to make the solution more conductive. Supporting electrolytes currently envisaged can include, but are not limited to, lithium salts, sodium salts, potassium salts, and mixtures thereof. Examples of supporting electrolytes include, but are not limited to, for example, sodium phosphate, sodium chloride, potassium phosphate, potassium chloride, potassium hexafluorophosphate, lithium hexafluorophosphate, tetrabutylammonium fluorophosphate, tetrabutylammonium chloride, lithium perchlorate, lithium nitrate and the like.

Also provided is a redox flow battery system including the above discussed electrolyte. In the battery system, the electrolyte will, during a charging state, form A) an anolyte comprising a coupled compound, which can be referred to as DSSD, two charged compounds, which can be referred to as $2DS^-$, or a mixture thereof in the polar solvent, and B) a catholyte comprising DSSD or $2S^-$, or a mixture thereof in a polar solvent, where D is the main DMTD body, e.g.:

and S is from the salted sulfur off the main DMTD body, e.g.:

$X^+ \bar{S}^{\diagup}$ so that DSSD refers to, for example:

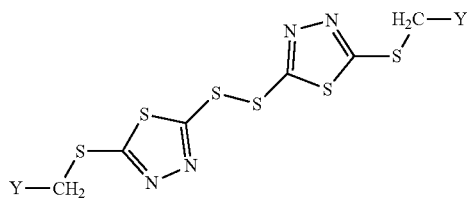

and DS⁻ refers to, for example:

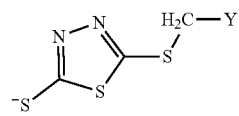

where Y is as described above.

The redox flow battery system can also include an ion exchange membrane or microporous membrane through which the electrolyte can readily flow. Current membranes envisaged for the RFB system include, but are not limited to, sulfonated tetrafluouroethylene based fluoropolymer-copolymer membranes, for example, cellulose-based dialysis membranes, and membranes of functionalized polystyrene blended with polyvinyl chloride. However, any membrane that can prevent crossover of the redox species in both states of charge, and allow diffusion of either positive or negative ions as charge carriers to maintain charge neutrality can be employed.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

EXAMPLES

Sample 1. Synthesis of 2-(Methylcarboxyethyl)thio-5-thiol-1,3,4-Thiadiazole. 225 grams of DMTD and 600 mL of toluene solvent were added to a 2-liter flask and 138.8 grams methyl acrylate added over 30 minutes. An exotherm from 23° C. to 29° C. occurred. The mixture was heated at 85° C. for six hours after which time the reaction was clear and all of the starting materials had dissolved. Toluene was vacuum stripped on a rotary evaporator to provide a solid upon cooling. This solid was recrystallized from reagent grade toluene:methanol 6:1 vol.:vol. with eventual cooling in a freezer overnight. The product was dried in a vacuum oven at 90° C. for 16 hours to remove all of the recrystallization solvents.

Sample 2. Synthesis of 2-(Ethylcarboxyethyl)thio-5-thiol-1,3,4-Thiadiazole. 150.2 grams of DMTD and 400 mL of toluene solvent were added to a 2-liter flask and 100.1 grams of ethyl acrylate added over 30 minutes. The mixture was heated at 85° C. for six hours after which time the reaction was clear and all of the starting materials had dissolved. Toluene was vacuum stripped on a rotary evaporator at 4 mm Hg vacuum and 80° C. to provide the desired product as a solid upon cooling.

Sample 3. Synthesis of 2-(2-Ethylhexylcarboxyethyl)thio-5-thiol-1,3,4-Thiadiazole. 150.2 grams of DMTD, 150 grams of toluene solvent, and 184.3 grams of 2-ethylhexyl acrylate were added to a 1-liter flask and heated at 85° C. for 7 hours. Toluene solvent was vacuum stripped on a rotary evaporator at 2 mm Hg vacuum and 80° C. for 5 hours to provide the desired product as a yellow liquid.

Sample 4. Synthesis of 2-(n-Butylcarboxyethyl)thio-5-thiol-1,3,4-Thiadiazole. 150.2 grams of DMTD and 450 mL of toluene solvent were added to a 2-liter flask and 128.2 grams of n-butyl acrylate added over 30 minutes. An exotherm from 23° C. to 28° C. occurred. The mixture was heated at 80° C. for six hours after which time the reaction was clear and all of the starting materials had dissolved. Toluene was vacuum stripped on a rotary evaporator at 2 mm Hg vacuum and 80° C. to provide the desired product as a solid upon cooling.

Sample 5. Synthesis of 2-(2-Hydroxyethylcarboxyethyl)thio-5-thiol-1,3,4-Thiadiazole. 150.2 grams of DMTD, 150 grams of toluene solvent, and 120 grams of 97% pure 2-hydroxyethyl acrylate were added to a 1-liter flask and heated at 85° C. for five hours. Toluene solvent was vacuum stripped on a rotary evaporator at 3 mm Hg vacuum and 80° C. for four hours. The product was obtained as a viscous yellow liquid after filtration through silicon dioxide filter aid.

Sample 6. Synthesis of 2-(2-Ethoxyethoxycarboxyethyl)thio-5-thiol-1,3,4-Thiadiazole 150.2 grams of DMTD, 150 grams of toluene solvent, and 188.2 grams of 2-ethoxyethoxy acrylate were added to a 1-liter flask and heated at 85° C. for two hours. Toluene solvent was vacuum stripped on a rotary evaporator at 3 mm Hg vacuum and 80° C. for four hours. The product was obtained as a viscous yellow liquid.

Sample 7. Synthesis of 2-(Laurylcarboxy-2-methylethyl)thio-5-thiol-1,3,4-Thiadiazole. 129 grams of DMTD, 216.2 grams of lauryl methacrylate, and 0.2 gram of sodium hydroxide catalyst were added to a one liter flask and heated at 105° C. for 14 hours after which time the reaction was clear and all of the starting materials had dissolved. The mixture was vacuum stripped on a rotary evaporator for six hours at 2 mm Hg vacuum and 80° C. to provide the desired product as a low melting solid.

Sample 8. Synthesis of 2-(Methylcarboxy-2-methylethyl)thio-5-thiol-1,3,4-Thiadiazole. 182.1 grams of DMTD, 121.3 grams of methyl methacrylate, 0.3 gram of potassium t-butoxide catalyst, and 400 mL of toluene solvent were added to a two liter flask and heated at 100° C. for 12 hours after which time a small amount of a yellow solid was removed by filtration. The mixture was vacuum stripped on a rotary evaporator for six hours at 2 mm Hg vacuum and 80° C. to provide the desired product as a yellow solid upon cooling.

Sample 9. Synthesis of 2-(n-Hexyl)thio-5-thiol-1,3,4-Thiadiazole. 150.2 grams of DMTD and 900 mL of ethanol were added to a 3-L flask and 56.1 grams of potassium hydroxide was added in portions over a 30 minute period. The reaction was heated at 75° C. for 2 hours under nitrogen and cooled to 24° C. 165.1 grams of n-hexylbromide was added over 20 minutes and the mixture heated at reflux (77° C.) for 6 hours. Ethanol was distilled from the reaction and the residue dissolved into 400 grams of water/600 mL of toluene and transferred to a separatory funnel. The organic phase was washed with additional water, collected, and dried over anhydrous sodium sulfate. After removal of the toluene on a rotary evaporator, the low-melting solid obtained was recrystallized from reagent grade toluene:n-hexane (80:20) wt.:wt. and dried in a vacuum oven to obtain the pure product.

Samples 10 to 13. Using a similar procedure from the corresponding alkyl bromides, the following DMTD mono-alkylates were prepared:

Sample 10. 2-(2-Ethylhexyl)thio-5-thiol-1,3,4-Thiadiazole

Sample 11. 2-Cyclohexylthio-5-thiol-1,3,4-Thiadiazole

Sample 12. 2-Isoamylthio-5-thiol-1,3,4-Thiadiazole

Sample 13. 2-(Ethylcarboxymethylene)thio-5-thiol-1,3,4-Thiadiazole

Sample 14. Synthesis of 2-(Methacryloylaminopropyltrimethylammonium chloride)thio-5-thiol-1,3,4-Thiadiazole. 84.1 grams of DMTD, 247 grams of 50% aqueous Methacryloylaminopropyltrimethylammonium chloride, 0.42 gram of sodium hydroxide, and 300 grams of water were added to a one liter flask and heated under nitrogen at 90° C. for 8 hours. The mixture was transferred to an open beaker and most of the water solvent was evaporated in a 65° C. oven on standing, followed by vacuum drying at 2 mm Hg and 95° C. for 20 hours. The final product was a crystalline solid.

Sample 15. Synthesis of 2-(Methacryloylaminopropyltrimethylammonium)thio-5-thiolate-1,3,4-Thiadiazole.
122.7 grams of 2-(Methacryloylaminopropyltrimethylammonium chloride) thio-5-thiol-1,3,4-Thiadiazole, 13.2 grams of sodium hydroxide, and 200 grams of deionized water were added to a one liter flask and heated under nitrogen at 70° C. for three hours. The mixture was transferred to an open beaker and most of the water solvent was evaporated in a 65° C. oven on standing, followed by vacuum drying at 5 mm Hg and 95° C. for 18 hours. The crystalline solid obtained was dissolved in 250 mL of ethanol and cooled to precipitate sodium chloride, which was removed by filtration. Ethanol was removed in a 65° C. oven and a vacuum oven to constant weight at 95° C.

Sample 16. Synthesis of 2-(Acryloylamino-2-methylpropylsulfonic acid)thio-5-thiol-1,3,4-thiadiazole. 98.15 grams of DMTD, 135.4 grams of 2-Acrylamido-2-methylpropanesulfonic acid, 0.2 gram of sodium hydroxide, and 200 grams of isopropanol solvent were added to a one liter flask and heated under nitrogen at 80° C. for 8 hours. The mixture was transferred to an open beaker and most of the water solvent was evaporated in a 65° C. oven on standing, followed by vacuum drying at 4 mm Hg and 95° C. for 22 hours. The final product was a crystalline solid.

Sample 17. Synthesis of Sodium 2-(Acryloylamino-2-methylpropyl-sulfonate)thio-5-thiol-1,3,4-thiadiazole.
150.2 grams of DMTD, 320.9 grams of 50% aqueous 2-Acrylamido-2-methylpropanesulfonic acid sodium salt, 80 grams of deionized water solvent were added to a one liter flask and heated under nitrogen at 80° C. for 6 hours. The mixture was transferred to an open beaker and most of the water solvent was evaporated in a 65° C. oven on standing, followed by vacuum drying at 3 mm Hg and 100° C. for 16 hours. The final product was a crystalline solid.

Sample 18. Synthesis of Disodium 2-(Acryloylamino-2-methylpropylsulfonate)thio-5-thiolate-1,3,4-thiadiazole.
72.7 grams of 2-(Acryloylamino-2-methylpropylsulfonic acid)-5-thiol-1,3,4-thiadiazole prepared in Sample 16, 16.25 grams of sodium hydroxide, 200 grams of deionized water solvent were added to a one liter flask and heated under nitrogen at 85° C. for 3 hours. The mixture was transferred to an open beaker and most of the water solvent was evaporated in a 65° C. oven on standing, followed by vacuum drying at 3 mm Hg and 105° C. for 16 hours. The final product was a crystalline solid.

Sample 19. Synthesis of 2-(Methacryloyloxyethyl trimethylammonium chloride)thio-5-thiol-1,3,4-Thiadiazole. 65.9 grams of DMTD, 126.5 grams of 72% aqueous Methacryloyloxyethyltrimethylammonium chloride, 0.2 gram of sodium hydroxide, and 125 grams of water were added to a one liter flask and heated under nitrogen at 90° C. for 8 hours. The mixture was transferred to an open beaker and most of the water solvent was evaporated in a 65° C. oven on standing, followed by vacuum drying at 2.5 mm Hg and 95° C. for 23 hours. The final product was a crystalline solid.

Sample 20. Synthesis of _2-(2-hydroxypropyltrimethylammonium chloride)thio-5-thiol-1,3,4-thiadiazole. 45.07 grams of DMTD, 45.9 grams of technical grade glycidyltrimethylammonium chloride, and 200 grams of reagent grade acetonitrile solvent were added to a one liter flask and heated under nitrogen at 80° C. for 8 hours. The mixture was transferred to an open beaker and most of the solvent was evaporated in a 65° C. oven on standing, followed by vacuum drying at 3.5 mm Hg and 90° C. for 22 hours. The final product was a yellow crystalline solid.

Sample 21. Synthesis of bis-2-(n-Hexyl-5-disulfide)-1,3,4-thiadiazole. 229 grams of 2-(n-Hexyl)thio-5-thiol-1,3,4-Thiadiazole prepared in Sample 9 was added to a one liter flask and 55.4 grams of 35% hydrogen peroxide in water was added over 45 minutes while keeping the temperature in the range of 75-80° C. under nitrogen. The reaction was heated at 85° C. for four hours, cooled, and dissolved into 300 mL of reagent grade toluene. This solution was washed with additional deionized water using a separatory funnel, collected, and dried over anhydrous sodium sulfate. The toluene solvent was removed using a rotary evaporator to obtain the disulfide as a low melting wax.

Sample 22. Synthesis of Sodium 2-(n-Hexyl)thio-5-thiolate-1,3,4-Thiadiazole. 42.5 grams of 2-(n-Hexyl)thio-5-thiol-1,3,4-Thiadiazole prepared in Sample 9, 7.25 grams of sodium hydroxide, and 200 mL of toluene solvent were added to a 1-L flask and heated at reflux for 6 hours. Water distillate was collected using a Dean Stark trap. The reaction mixture was transferred to an open beaker and most of the solvent was evaporated in a 65° C. oven on standing, followed by vacuum drying at 2 mm Hg and 90° C. for 18 hours. The final product was a light yellow solid.

Sample 23. Synthesis of 2-[(Methacryloyloxy)ethyl-dimethyl-(3-sulfopropyl)ammonium]thio-5-thiol-1,3,4-Thiadiazole. 86.6 grams of [2-(Methacryloyloxy)ethyl]dimethyl-(3-sulfopropyl)ammonium hydroxide, 46.6 grams of DMTD, 0.3 gram of sodium hydroxide, and 250 grams of deionized water were added to a one liter flask and heated under nitrogen at 85° C. for six hours. The mixture was transferred to an open beaker and most of the water solvent was evaporated in a 65° C. oven on standing, followed by vacuum drying at 3 mm Hg and 85° C. for 18 hours. The product was obtained as a glasslike solid.

Sample 24. Synthesis of Potassium 2-[(Methacryloyloxy)ethyl-dimethyl-(3-sulfopropyl)ammonium]thio-5-thiolate-1,3,4-Thiadiazole. 59.3 grams of [2-(Methacryloyloxy)ethyl]dimethyl-(3-sulfopropyl)ammonium hydroxide, 40 grams of DMTD mono-potassium salt, 0.3 gram of potassium hydroxide, and 200 grams of deionized water were added to a one liter flask and heated under nitrogen at 85° C. for six hours. The mixture was transferred to an open beaker and most of the water solvent was evaporated in a 65° C. oven on standing, followed by vacuum drying at 5 mm Hg and 85° C. for 20 hours. The product was obtained as a yellow solid.

Sample 25. Synthesis of Potassium 2-[(Methacryloyloxy-3-sulfopropyl)thio-5-thiol-1,3,4-Thiadiazole. 73.9 grams of 3-sulfopropyl methacrylate potassium salt, 45.07 grams of DMTD, 0.2 gram of sodium hydroxide, and 250 grams of deionized water were added to a one liter flask and heated under nitrogen at 85-90° C. for 12 hours. The mixture was transferred to an open beaker and most of the water solvent was evaporated in a 65° C. oven on standing, followed by vacuum drying at 3 mm Hg and 90° C. for 28 hours. The product was obtained as a yellow solid.

Sample 26. Synthesis of Dipotassium 2-[(Methacryloyloxy-3-sulfopropyl)thio-5-thiolate-1,3,4-Thiadiazole. 49.7 grams of 3-sulfopropyl methacrylate potassium salt, 38 grams of DMTD mono-potassium salt, 0.3 gram of potassium hydroxide, and 225 grams of deionized water were added to a one liter flask and heated under nitrogen at 85° C. for six hours. The clear mixture was transferred to an open beaker and most of the water solvent was evaporated in a 65° C. oven on standing, followed by vacuum drying at 3.5 mm Hg and 95° C. for 24 hours. The product was obtained as an amber solid.

Sample 27. Synthesis of Dipotassium 2-(2-methylethyl-2-carboxylate)thio-5-thiolate-1,3,4-Thiadiazole. 100 grams of ester prepared in Example 8, 44.8 grams of potassium hydroxide, and 300 grams of deionized water were added to a one liter flask and heated at reflux (90° C.) for 14 hours while collecting distillate in a Dean Stark trap. The clear mixture was transferred to an open beaker and most of the water solvent was evaporated in a 65° C. oven on standing, followed by vacuum drying at 4.5 mm Hg and 95° C. for 26 hours. The product was obtained as a light yellow crystalline solid.

Sample 28. Synthesis of Disodium 2-(Propyl-2,3-dicarboxylate)thio-5-thiol-1,3,4-Thiadiazole. 65.25 grams of Itaconic acid, 75.1 grams of DMTD, 0.3 gram of sodium hydroxide, and 200 grams of deionized water were added to a one liter flask and heated under nitrogen at 90° C. for six hours. The clear mixture was cooled to room temperature and 40 grams of sodium hydroxide addded, followed by heating at 70° C. for four hours. The mixture was transferred to an open beaker and most of the water solvent was evaporated in a 65° C. oven on standing, followed by vacuum drying at 4 mm Hg and 95° C. for 26 hours. The product was obtained as a yellow solid powder.

Sample 29. Synthesis of Trisodium 2-(Propyl-2,3-dicarboxylate)thio-5-thiolate-1,3,4-Thiadiazole. 40 grams of DMTD mono-sodium salt, 30.2 grams of Itaconic acid, and 250 grams of deionized water were added to a one liter flask. 18.6 grams of sodium hydroxide was then added the mixture heated under nitrogen at 90° C. for 12 hours. The mixture was cooled to room temperature and a small amount of insoluble solid removed through filter paper. The clear mixture was transferred to an open beaker and most of the water solvent was evaporated in a 65° C. oven on standing, followed by vacuum drying at 2 mm Hg and 100° C. for 28 hours. The product was obtained as a yellow solid powder.

Sample 30. Synthesis of Disodium 2-(Ethyl-2,3-dicarboxylate)thio-5-thiol-1,3,4-Thiadiazole. 46.45 grams of maleic acid, 60.1 grams of DMTD, 0.25 gram of sodium hydroxide, and 175 grams of deionized water were added to a one liter flask and heated under nitrogen at 90° C. for six hours. The clear mixture was cooled to room temperature and 32 grams of sodium hydroxide addded, followed by heating at 70° C. for four hours. The mixture was transferred to an open beaker and most of the water solvent was evaporated in a 65° C. oven on standing, followed by vacuum drying at 2 mm Hg and 95° C. for 24 hours. The product was obtained as a yellow solid.

Sample 31. Synthesis of Disodium 2-(2-methylethyl-2-carboxylate)thio-5-thiolate-1,3,4-Thiadiazole. 35 grams of DMTD mono-sodium salt, 22 grams of sodium methacrylate, 0.3 gram of sodium hydroxide catalyst, and 200 grams of deionized water solvent were added to a one liter flask and heated at 90° C. for 8 hours and cooled. A small amount of an insoluble solid was removed by filtration through filter paper. The clear mixture was transferred to an open beaker and most of the water solvent was evaporated in a 65° C. oven on standing, followed by vacuum drying at 2.5 mm Hg and 95° C. for 24 hours. The product was obtained as a light yellow solid.

Sample 32. Synthesis of 2-(2,3-Dicarboxypropyl)thio-5-thiol-1,3,4-Thiadiazole. 105.16 g of 2,5-dimercapto-1,3,4-thiadiazole, 300 g of deionized water, 91.1 g of itaconic acid and 0.3 g of sodium hydroxide catalyst were added to a 1-L flask and heated under nitrogen at 88° C. for 10 hours and cooled. Most of the water was evaporated in a steam oven at 65° C. in an open beaker. The product was then dried in a vac oven at 95° C. until constant weight. The product yield was 194 g.

Samples 33-36. A procedure similar to Example 32 was used starting from acrylic acid, methacrylic acid, maleic acid, or aconitic acid to prepare the following:

Sample 33. 2-(2-Carboxyethyl)thio-5-thiol-1,3,4-thiadiazole

Sample 34. 2-(2-Methylethyl-2-carboxy)thio-5-thiol-1,3,4-thiadiazole

Sample 35. 2-(1,2-Dicarboxyethyl)thio-5-thiol-1,3,4-thiadiazole

Sample 36. 2-(1,2,3-Tricarboxypropyl)thio-5-thiol-1,3,4-thiadiazole

Sample 37. Synthesis of Trisodium 2-(propyl-2,3-dicarboxylate)thio-5-thiolate-1,3,4-thiadiazole. An alternate procedure was used to prepare Sample 29. 32 g of the diacid product prepared in Example 32, 250g of deionized water, and 13.7 g of sodium hydroxide were added to a 1-L flask and heated under nitrogen at 85° C. for 6 hours. The mixture was transferred to an open beaker and most of the water evaporated in a steam oven at 65° C. The product was dried in a vacuum oven at 95° C. to constant weight to obtain 38.8 g of a light yellow solid.

Samples 38-44. The procedure of Sample 37 was used to prepare the following products from the carboxylic acids prepared in Samples 33-36:

Sample 38. Dipotassium 2-(ethyl-2-carboxylate)thio-5-thiolate-1,3,4-thiadiazole

Sample 39. Tripotassium 2-(ethyl-1,2-dicarboxylate)thio-5-thiolate-1,3,4-thiadiazole Sample 40. Tripotassium 2-(propyl-2,3-dicarboxylate)thio-5-thiolate-1,3,4-thiadiazole Sample 41. Tetrapotassium 2-(propyl-1,2,3-tricarboxylate)thio-5-thiolate-1,3,4-thiadiazole Sample 42. Dipotassium 2-(2-methylethyl-2-carboxylate)thio-5-thiolate-1,3,4-thiadiazole Sample 43. Tetrasodium 2-(propyl-1,2,3-tricarboxylate)thio-5-thiolate-1,3,4-thiadiazole Sample 44. Disodium 2-(2-methylethyl-2-dicarboxylate)thio-5-thiolate-1,3,4-thiadiazole Sample 45. Synthesis of Diammonium 2-(propyl-2,3-dicarboxylate)thio-5-thiolate-1,3,4-thiadiazole. 40 g of the diacid product prepared in Sample 32, 19 g of aqueous ammonia solution, and 212.8 of deionized water were added to a 1-L flask and stirred under nitrogen at 25° C. for three hours. The reaction mixture was clear and free of solids. 271 g of a 20% weight product solution in water was obtained.

Sample 46. Synthesis of Triammonium 2-(propyl-1,2,3-tricarboxylate)thio-5-thiol-1,3,4-thiadiazole. A procedure similar to Sample 45 was used starting from the triacid prepared in Sample 36 to prepare this product as a 20.3% weight solution in deionized water.

Sample 47. Preparation of a pH 7 Phosphate Buffer in 1M Potassium Chloride. 74.55 g of potassium chloride, 6.309 g of potassium dihydrogen phosphate, and 9.343 g of dipotassium hydrogen phosphate were added to a 1-liter volumetric flask. The mixture was diluted to 1.0 liter with deionized water and mixed until homogenous.

Sample 48. Preparation of a pH 7 Phosphate Buffer in 1M Sodium Chloride. 58.5 g of sodium chloride, 5.56 g of sodium dihydrogen phosphate, and 7.62 g of disodium hydrogen phosphate were added to a 1-liter volumetric flask. The mixture was diluted to 1.0 liter with deionized water and mixed until homogenous.

Where indicated, CV and H-Cell evaluations were run in the pH 7 buffered solutions prepared in Samples 47 or 48. Electrochemical testing of the formulated DMTD derivatives to confirm they work as RFB electrolytes consisted of Cyclic Voltammetry (CV) millivolt peak gap measurements and H-cell cycle testing/specific energy retention measurements.

CV millivolt peak gap measurements involve scanning the electrolyte with a cyclic Voltammogram at a specified temperature and scan rate. The electrolytes in table 1 were scanned at a temperature of 22° C. and a scan rate of 100 mV/s. A CV cathode/anode peak gap of 600 millivolts or less is considered to be a viable result for electrolyte redox reversibility in an RFB application. The results of the CV millivolt tests are shown in Table 1.

TABLE 1

CV Electrochemical Testing of DMTD Derivatives

| Sample | [Concentration] Electrolyte Solvent | Co-Electrolytes or Co-Additives | Cathode/ Anode Peak Gap |
|---|---|---|---|
| Sample 1 | [1 mM] Acetonitrile | 0.1M LiClO$_4$ 1 mM (Et)$_3$N | 600 mV |
| Sample 1 | [2 mM] Propylene Carbonate | 1M KPF$_6$ 2 mM (Et)$_3$N | 600 mV |
| Sample 1 | [10 mM] Dimethyl Carbonate: Ethylene Carbonate (50:50) vol. | 1M LiPF$_6$ | 600 mV |
| Sample 3 | [1 mM] Acetonitrile | 0.1M LiClO$_4$ 1 mM (Et)$_3$N | 800 mV |
| Sample 3 | [10 mM] Acetonitrile | 0.1M KPF$_6$ | 500 mV |
| Sample 4 | [10 mM] Propylene Carbonate | 1M KPF$_6$ 10 mM (Et)$_3$N | 600 mV |
| Sample 5 | [1 mM] Acetonitrile | 0.1M LiClO$_4$ 1 mM (Et)$_3$N | Irreversible |
| Sample 8 | [10 mM] Propylene Carbonate | 1M KPF$_6$ 10 mM (Et)$_3$N | 650 mV |
| Sample 9 | [1 mM] Acetonitrile | 0.1M LiClO$_4$ | 300 mV |
| Sample 9 | [10 mM] Acetonitrile | 0.1M LiClO$_4$ 10 mM (Et)$_3$N | 700 mV |
| Sample 9 | [10 mM] Acetonitrile | 0.1M KPF$_6$ 10 mM (Et)$_3$N | 600 mV |
| Sample 10 | [1 mM] Acetonitrile | 0.1M LiClO, 1 mM (Et)$_3$N | 500 mV |
| Sample 12 | [2 mM] Acetonitrile | 0.1M LiClO$_4$ | Irreversible |
| Sample 13 | [2 mM] Acetonitrile | 0.1M LiClO$_4$ 2 mM (Et)$_3$N | 600 mV |

TABLE 1-continued

CV Electrochemical Testing of DMTD Derivatives

| Sample | [Concentration] Electrolyte Solvent | Co-Electrolytes or Co-Additives | Cathode/ Anode Peak Gap |
|---|---|---|---|
| Sample 14 | [4 mM] Acetonitrile | 0.1M LiClO$_4$ 4 mM (Et)$_3$N | 500 mV |
| Sample 14 | [10 mM] 1M KCl in Deionized Water | K$_2$HPO$_4$/KH$_2$PO$_4$ (pH 7 buffer) | 900 mV |
| Sample 15 | [10 mM] 1M NaCl in Deionized Water | Na$_2$HPO$_4$/NaH$_2$PO$_4$ (pH 7 buffer) | 700 mV |
| Sample 15 | [10 mM] Deionized Water | 0.1M Tetrabutyl Ammonium Chloride | 750 mV |
| Sample 15 | [10 mM] 1M KCl in Deionized Water | K$_2$HPO$_4$/KH$_2$PO$_4$ (pH 7 buffer) | 500 mV |
| Sample 15 | [10 mM] 2M NaCl in Deionized Water | none | 800 mV |
| Sample 17 | [10 mM] Dimethyl Carbonate: Ethylene Carbonate (50:50) vol. | 1M LiPF$_6$ 10 mM (Et)$_3$N | Irreversible |
| Sample 18 | [20 mM] 1M NaCl in Deionized Water | Na$_2$HPO$_4$/NaH$_2$PO$_4$ (pH 7 buffer) | 900 mV |
| Sample 19 | [10 mM] 1M NaCl in Deionized Water | Na$_2$HPO$_4$/NaH$_2$PO$_4$ (pH 7 buffer) | 900 mV |
| Sample 19 | [10 mM] 1M KCl in Deionized Water | K$_2$HPO$_4$/KH$_2$PO$_4$ (pH 7 buffer) | 800 mV |
| Sample 19 | [10 mM] Deionized Water | 0.1M Tetrabutyl Ammonium Chloride | 1200 mV |
| Sample 21 | [2 mM] Acetonitrile | 0.1M LiClO$_4$ 2 mM (Et)$_3$N | 600 mV |
| Sample 29 | [10 mM] 1M NaCl in Deionized Water | Na$_2$HPO$_4$/NaH$_2$PO$_4$ (pH 7 buffer) | 1000 mV |
| Sample 29 | [8 mM] 1M KCl in Deionized Water | K$_2$HPO$_4$/KH$_2$PO$_4$ (pH 7 buffer) | 850 mV |
| Sample 29 | [8 mM] 1M KCl in Deionized Water | 0.1M K$_2$CO$_3$ (pH 10) | Irreversible |
| Sample 29 | [8 mM] 1M KCl in Deionized Water | K$_2$HPO$_4$/KH$_2$PO$_4$ (pH 7 buffer) | 850 mV |
| Sample 29 | [10 mM] 1M NH$_4$Cl in Deionized Water | none | 850 mV |
| Sample 33 | [10 mM] 1M KCl in Deionized Water | K$_2$HPO$_4$/KH$_2$PO$_4$ (pH 7 buffer) | 603 mV |
| Sample 35 | [10 mM] 1M KCl in Deionized Water | K$_2$HPO$_4$/KH$_2$PO$_4$ (pH 7 buffer) | 900 mV |
| Sample 37 | [10 mM] 1M KCl in Deionized Water | K$_2$HPO$_4$/KH$_2$PO$_4$ (pH 7 buffer) | 1100 mV |
| Sample 46 | [10 mM] 1M KCl in Deionized Water | K$_2$HPO$_4$/KH$_2$PO$_4$ (pH 7 buffer) | 668 mV |

H-cell cycle testing/specific energy retention measurements involve galvanostatic discharge—charge of a symmetric battery, where monoalkylated DMDT anion/disulfide was used as both cathode and anode in a H-cell under galvanostatic control. The two compartments of the H-cell were separated with a G5 glass frit. The voltage cutoffs were determined based on CV data (Table 1). This simple H-cell setup allows a direct evaluation of the stability of monoalkylated DMDT during electro-chemical cycling (*J. Am. Chem. Soc.* 2016, 138, 13230. and *J. Am. Chem. Soc.* 2017, 139, 2924.). The charge-discharge cycling was performed at 100% state of charge with a rate of 1 C (one hour charging and one hour discharge). Efficiency ratings of 70-85% for the H-cell testing are considered very good performance. The results of the H-Cell tests are shown in Table 2.

TABLE 2

H-Cell Electrochemical Testing of DMTD Derivatives

| Sample | [Concentration] Electrolyte Solvent | Co-Electrolytes or Co-Additives | H-Cell Number of Cycles | H-Cell Capacity Retention |
|---|---|---|---|---|
| Sample 1 | [10 mM] Acetonitrile | 0.1M $KPF_6$ 10 mM $(Et)_3N$ | 112 | 83% |
| Sample 1 | [10 mM] Propylene Carbonate | 1M $KPF_6$ 10 mM $(Et)_3N$ | 20 | 15% |
| Sample 1 | [10 mM] Dimethyl Carbonate: Ethylene Carbonate (50:50) vol. | 1M $LiPF_6$ | 1 | 4% |
| Sample 4 | [10 mM] Propylene Carbonate | 1M $KPF_6$ 10 mM $(Et)_3N$ | 27 | 16% |
| Sample 8 | [10 mM] Propylene Carbonate | 1M $KPF_6$ 10 mM $(Et)_3N$ | 10 | 27% |
| Sample 9 | [10 mM] Acetonitrile | 0.1M $KPF_6$ 10 mM $(Et)_3N$ | 68 | 32% |
| Sample 9 | [10 mM] Acetonitrile | 0.1M $LiClO_4$ 10 mM $(Et)_3N$ | 3 | 51% |
| Sample 10 | [10 mM] Acetonitrile | 0.1M $LiClO_4$ 10 mM $(Et)_3N$ | 120 | 43% |
| Sample 13 | [10 mM] Acetonitrile | 0.1M $KPF_6$ 10 mM $(Et)_3N$ | 65 | 62% |
| Sample 14 | [10 mM] Acetonitrile | 0.1M $KPF_6$ 10 mM $(Et)_3N$ | 10 | 93% |
| Sample 14 | [10 mM] 1M NaCl in Deionized Water | $Na_2HPO_4/NaH_2PO_4$ (pH 7 buffer) | 4 | 8% |
| Sample 15 | [10 mM] 1M NaCl in Deionized Water | $Na_2HPO_4/NaH_2PO_4$ (pH 7 buffer) | 2 | 7% |
| Sample 15 | [10 mM] Deionized Water | 0.1M Tetrabutyl Ammonium Chloride | 62 | 9% |
| Sample 15 | [10 mM] 1M KCl in Deionized Water | $K_2HPO_4/KH_2PO_4$ (pH 7 buffer) | 45 | 20% |
| Sample 15 | [10 mM] 0.1M KCl in Deionized Water | none | 4 | 13% |
| Sample 18 | [20 mM] 1M NaCl in Deionized Water | $Na_2HPO_4/NaH_2PO_4$ (pH 7 buffer) | 3 | 99% |
| Sample 19 | [10 mM] Deionized Water | 0.1M Tetrabutyl Ammonium Chloride | not stable | |
| Sample 19 | [20 mM] 1M NaCl in Deionized Water | $Na_2HPO_4/NaH_2PO_4$ (pH 7 buffer) | | |
| Sample 21 | [10 mM] Acetonitrile | 0.1M $KPF_6$ 10 mM $(Et)_3N$ | 3 | 35% |
| Sample 29 | [10 mM] 1M NaCl in Deionized Water | $Na_2HPO_4/NaH_2PO_4$ (pH 7 buffer) | | 53% |
| Sample 29 | [10 mM] 1M KCl in Deionized Water | $K_2HPO_4/KH_2PO_4$ (pH 7 buffer) | | |
| Sample 29 | [8 mM] 1M KCl in Deionized Water | $K_2HPO_4/KH_2PO_4$ (pH 7 buffer) | | 80% |
| Sample 29 | [10 mM] 1M $NH_4Cl$ in Deionized Water | none | | <20% |
| Sample 33 | [10 mM] 1M KCl in Deionized Water | $K_2HPO_4/KH_2PO_4$ (pH 7 buffer) | | |
| Sample 35 | [10 mM] 1M KCl in Deionized Water | $K_2HPO_4/KH_2PO_4$ (pH 7 buffer) | | 23% |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

A redox flow battery electrolyte comprising, consisting essentially of, consisting of A) a polar solvent, and B) DMTD or derivatives thereof.

The redox flow battery electrolyte of the previous paragraph, wherein the polar solvent comprises, consists essentially of, consists of water.

The redox flow battery electrolyte of any previous paragraph, wherein the polar solvent comprises, consists essentially of, consists of an organic solvent, such as carbonates, ethers, ketones, nitriles, alcohols, glycols, amines, amides, organic solvents and combinations thereof.

The redox flow battery electrolyte of any previous paragraph, wherein the polar solvent comprises, consists essentially of, consists of $C_1$ to $C_{10}$ alcohol The redox flow battery electrolyte of any previous paragraph, wherein the polar solvent comprises, consists essentially of, consists of $C_1$ to $C_{10}$ glycol.

The redox flow battery electrolyte of any previous paragraph, wherein the polar solvent comprises, consists essentially of, consists of methanol.

The redox flow battery electrolyte of any previous paragraph, wherein the polar solvent comprises, consists essentially of, consists of ethanol.

The redox flow battery electrolyte of any previous paragraph, wherein the polar solvent comprises, consists essentially of, consists of 1-propanol.

The redox flow battery electrolyte of any previous paragraph, wherein the polar solvent comprises, consists essentially of, consists of 2-propanol.

The redox flow battery electrolyte of any previous paragraph, wherein the polar solvent comprises, consists essentially of, consists of ethylene glycol.

The redox flow battery electrolyte of any previous paragraph, wherein the polar solvent comprises, consists essentially of, consists of propylene glycol.

The redox flow battery electrolyte of any previous paragraph, wherein the polar solvent comprises, consists essentially of, consists of dimethoxymethane.

The redox flow battery electrolyte of any previous paragraph, wherein the polar solvent comprises, consists essentially of, consists of methoxybenzene (anisole)

The redox flow battery electrolyte of any previous paragraph, wherein the polar solvent comprises, consists essentially of, consists of tetrahydrofuran (THF).

The redox flow battery electrolyte of any previous paragraph, wherein the polar solvent comprises, consists essentially of, consists of 2-methyltetrahydrofuran.

The redox flow battery electrolyte of any previous paragraph, wherein the polar solvent comprises, consists essentially of, consists of 1,4-dioxane.

The redox flow battery electrolyte of any previous paragraph, wherein the polar solvent comprises, consists essentially of, consists of 1,3-dioxolane (DOL).

The redox flow battery electrolyte of any previous paragraph, wherein the polar solvent comprises, consists essentially of, consists of 4-methyl-1,3-dioxolane.

The redox flow battery electrolyte of any previous paragraph, wherein the polar solvent comprises, consists essentially of, consists of 1,2-dimethoxyethane (DME).

The redox flow battery electrolyte of any previous paragraph, wherein the polar solvent comprises, consists essentially of, consists of bis(2-methoxyethyl) ether (diglyme).

The redox flow battery electrolyte of any previous paragraph, wherein the polar solvent comprises, consists essentially of, consists of acetone.

The redox flow battery electrolyte of any previous paragraph, wherein the polar solvent comprises, consists essentially of, consists of acetylacetone.

The redox flow battery electrolyte of any previous paragraph, wherein the polar solvent comprises, consists essentially of, consists of acetonitrile (CAN).

The redox flow battery electrolyte of any previous paragraph, wherein the polar solvent comprises, consists essentially of, consists of methoxyacetonitrile.

The redox flow battery electrolyte of any previous paragraph, wherein the polar solvent comprises, consists essentially of, consists of propionitrile.

The redox flow battery electrolyte of any previous paragraph, wherein the polar solvent comprises, consists essentially of, consists of butyronitrile.

The redox flow battery electrolyte of any previous paragraph, wherein the polar solvent comprises, consists essentially of, consists of isobutyronitrile.

The redox flow battery electrolyte of any previous paragraph, wherein the polar solvent comprises, consists essentially of, consists of benzonitrile.

The redox flow battery electrolyte of any previous paragraph, wherein the polar solvent comprises, consists essentially of, consists of 3-methoxypropionitrile The redox flow battery electrolyte of any previous paragraph, wherein the polar solvent comprises, consists essentially of, consists of ethylenediamine.

The redox flow battery electrolyte of any previous paragraph, wherein the polar solvent comprises, consists essentially of, consists of pyridines.

The redox flow battery electrolyte of any previous paragraph, wherein the polar solvent comprises, consists essentially of, consists of formamide.

The redox flow battery electrolyte of any previous paragraph, wherein the polar solvent comprises, consists essentially of, consists of n-methylacetamide.

The redox flow battery electrolyte of any previous paragraph, wherein the polar solvent comprises, consists essentially of, consists of N,N-dimethylformamide (DMF).

The redox flow battery electrolyte of any previous paragraph, wherein the polar solvent comprises, consists essentially of, consists of N,N-dimethylacetamide (DMA).

The redox flow battery electrolyte of any previous paragraph, wherein the polar solvent comprises, consists essentially of, consists of N-methyl-2-pyrrolidinone (NMP).

The redox flow battery electrolyte of any previous paragraph, wherein the polar solvent comprises, consists essentially of, consists of propylene carbonate (PC).

The redox flow battery electrolyte of any previous paragraph, wherein the polar solvent comprises, consists essentially of, consists of ethylene carbonate (EC).

The redox flow battery electrolyte of any previous paragraph, wherein the polar solvent comprises, consists essentially of, consists of γ-butyrolactone (γ-BL).

The redox flow battery electrolyte of any previous paragraph, wherein the polar solvent comprises, consists essentially of, consists of γ-valerolactone (γ-VL).

The redox flow battery electrolyte of any previous paragraph, wherein the polar solvent comprises, consists essentially of, consists of dimethyl carbonate (DMC).

The redox flow battery electrolyte of any previous paragraph, wherein the polar solvent comprises, consists essentially of, consists of diethyl carbonate (DEC).

The redox flow battery electrolyte of any previous paragraph, wherein the polar solvent comprises, consists essentially of, consists of ethyl methyl carbonate (EMC).

The redox flow battery electrolyte of any previous paragraph, wherein the polar solvent comprises, consists essentially of, consists of 1,2-butylene carbonate.

The redox flow battery electrolyte of any previous paragraph, wherein the polar solvent comprises, consists essentially of, consists of hexane.

The redox flow battery electrolyte of any previous paragraph, wherein the polar solvent comprises, consists essentially of, consists of benzene.

The redox flow battery electrolyte of any previous paragraph, wherein the polar solvent comprises, consists essentially of, consists of toluene.

The redox flow battery electrolyte of any previous paragraph, wherein the polar solvent comprises, consists essentially of, consists of nitromethane.

The redox flow battery electrolyte of any previous paragraph, wherein the polar solvent comprises, consists essentially of, consists of nitrobenzene.

The redox flow battery electrolyte of any previous paragraph, wherein the polar solvent comprises, consists essentially of, consists of 1,2-dichloroethane.

The redox flow battery electrolyte of any previous paragraph, wherein the polar solvent comprises, consists essentially of, consists of dimethyl sulfoxide (DMSO).

The redox flow battery electrolyte of any previous paragraph, wherein the polar solvent comprises, consists essentially of, consists of ethyl acetate.

The redox flow battery electrolyte of any previous paragraph, wherein the polar solvent comprises, consists essentially of, consists of nitroethane.

The redox flow battery electrolyte of any previous paragraph, wherein the electrolyte comprises, consists essentially of, consists of a DMTD derivative.

The redox flow battery electrolyte of any previous paragraph, wherein the DMTD derivative comprises, consists essentially of, consists of a compound of formula I:

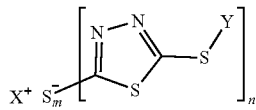

Formula I where
each "X," individually is an alkali or alkaline earth metal, such as Li, Na, K, Mg, or Ca, a trialkyl amine, or a quaternary amine (including ammonia), or H;
"m" is 1, 2 or 3, and "n" is 1 or 2; and
where "Y" is:
"R," a linear, branched, saturated or unsaturated, or cyclic $C_1$ to $C_{12}$, or $C_1$ to $C_{10}$, or $C_1$ to $C_8$, or even $C_1$ to $C_6$ alkyl or aryl group, or H;
"[RO]$_o$R," where "o" is an integer from 1 to 100;
"R[OH]$_p$A," where "p" is an integer from 1 to 6 and "A" is H or an amine, such as a trialkyl amine or a quaternary amine salt; or
a carboxylate or carboxamide group, such as, for example, an itaconate, maleate, or for example, a (meth)acrylate or (meth)acrylamide which would form "CH$_2$CH[CH$_3$ or H]C(O)[O or NH]Z," where "Z" can be H, X, "R," RN$^+$(R)$_3$SO$_3^-$, RN$^+$(R)$_3$SO$_3^-$K$^+$, "RSO$_3^-$Na$^+$," RSO$_3^-$NH$_4^+$, "RSO$_3$H," or "RN$^+$(R)$_3$Cl$^-$."

The redox flow battery electrolyte of any previous paragraph, wherein n in formula I is 1 and m in formula I is 1 to provide an un-coupled compound of formula II

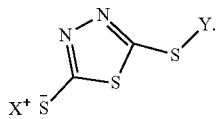

Formula II

The redox flow battery electrolyte of any previous paragraph, wherein the DMTD derivative comprises, consists essentially of, consists of a mono-alkylated derivative, an etherified derivative, an alcohol derivative, a carboxylate derivative, a carboxamide derivative, and combinations thereof.

The redox flow battery electrolyte of any previous paragraph, wherein the DMTD derivative comprises, consists essentially of, consists of the reaction product of DMTD and a halogenated alkyl or aryl group.

The redox flow battery electrolyte of any previous paragraph, wherein the substituent Y of the DMTD derivative of formula I is "R," a linear, branched, saturated or unsaturated, or cyclic $C_1$ to $C_{12}$, or $C_1$ to $C_{10}$, or $C_1$ to $C_8$, or even $C_1$ to $C_6$ alkyl or aryl group, or H;

The redox flow battery electrolyte of any previous paragraph, wherein the DMTD derivative comprises, consists essentially of, consists of a compound of formula VI

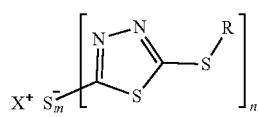

Formula VI where X, m, and n are as set forth for Formula I, and R is a linear, branched, saturated or unsaturated, cyclic $C_1$ to $C_{12}$, or $C_1$ to $C_{10}$, or $C_1$ to $C_8$, or even $C_1$ to $C_6$ alkyl or aryl group; or H.

The redox flow battery electrolyte of any previous paragraph, wherein the "R" group comprises, consists essentially of, consists of a methyl group.

The redox flow battery electrolyte of any previous paragraph, wherein the "R" group comprises, consists essentially of, consists of an ethyl group.

The redox flow battery electrolyte of any previous paragraph, wherein the "R" group comprises, consists essentially of, consists of a propyl group.

The redox flow battery electrolyte of any previous paragraph, wherein the "R" group comprises, consists essentially of, consists of a butyl group.

The redox flow battery electrolyte of any previous paragraph, wherein the "R" group comprises, consists essentially of, consists of a pentyl group.

The redox flow battery electrolyte of any previous paragraph, wherein the "R" group comprises, consists essentially of, consists of a hexyl group.

The redox flow battery electrolyte of any previous paragraph, wherein the "R" group comprises, consists essentially of, consists of a heptyl group.

The redox flow battery electrolyte of any previous paragraph, wherein the "R" group comprises, consists essentially of, consists of an octyl group.

The redox flow battery electrolyte of any previous paragraph, wherein the "R" group comprises, consists essentially of, consists of a nonyl group.

The redox flow battery electrolyte of any previous paragraph, wherein the "R" group comprises, consists essentially of, consists of a decyl group.

The redox flow battery electrolyte of any previous paragraph, wherein the "R" group comprises, consists essentially of, consists of a undecyl group.

The redox flow battery electrolyte of any previous paragraph, wherein the "R" group comprises, consists essentially of, consists of a dodecyl group.

The redox flow battery electrolyte of any previous paragraph, wherein the "R" group comprises, consists essentially of, consists of an isobutyl group.

The redox flow battery electrolyte of any previous paragraph, wherein the "R" group comprises, consists essentially of, consists of an ethylhexyl group.

The redox flow battery electrolyte of any previous paragraph, wherein the "R" group comprises, consists essentially of, consists of an isoamyl group.

The redox flow battery electrolyte of any previous paragraph, wherein the "R" group comprises, consists essentially of, consists of a benzyl group.

The redox flow battery electrolyte of any previous paragraph, wherein the "R" group comprises, consists essentially of, consists of a cyclohexyl group.

The redox flow battery electrolyte of any previous paragraph, wherein the DMTD derivative comprises, consists essentially of, consists of the reaction product of DMTD and a halogenated ether ("halo-ether") group.

The redox flow battery electrolyte of any previous paragraph, wherein the substituent Y of the DMTD derivative of formula I is "[RO]$_o$R," where "o" is an integer from 1 to 100.

The redox flow battery electrolyte of any previous paragraph, wherein the DMTD derivative comprises, consists essentially of, consists of a compound of formula VII

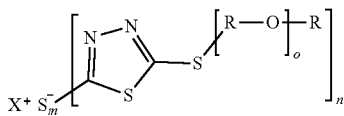

Formula VII where X, R, m, and n are as set forth for Formula I, and "o" is an integer from 1 to 100, or 1 to 75, or 1 to 50, or 1 to 25, or 1 to 20, or 1 to 15, or 1 to 10, or 2 to 10 or 4 to 10 or 6 to 10.

The redox flow battery electrolyte of any previous paragraph, wherein the ether of the halogenated ether comprises, consists essentially of, consists of dimethyl ether.

The redox flow battery electrolyte of any previous paragraph, wherein the ether of the halogenated ether comprises, consists essentially of, consists of diethyl ether.

The redox flow battery electrolyte of any previous paragraph, wherein the ether of the halogenated ether comprises, consists essentially of, consists of dipropyl ether.

The redox flow battery electrolyte of any previous paragraph, wherein the ether of the halogenated ether comprises, consists essentially of, consists of methyl ethyl ether.

The redox flow battery electrolyte of any previous paragraph, wherein the ether of the halogenated ether comprises, consists essentially of, consists of methyl phenyl ether.

The redox flow battery electrolyte of any previous paragraph, wherein the ether of the halogenated ether comprises, consists essentially of, consists of paraformaldehyde.

The redox flow battery electrolyte of any previous paragraph, wherein the ether of the halogenated ether comprises, consists essentially of, consists of polyethylene glycol.

The redox flow battery electrolyte of any previous paragraph, wherein the ether of the halogenated ether comprises, consists essentially of, consists of polypropylene glycol.

The redox flow battery electrolyte of any previous paragraph, wherein the ether of the halogenated ether comprises, consists essentially of, consists of polytetrahydrofuran.

The redox flow battery electrolyte of any previous paragraph, wherein the DMTD derivative comprises, consists essentially of, consists of the reaction product of DMTD and a carboxylate group.

The redox flow battery electrolyte of any previous paragraph, wherein the substituent Y of the DMTD derivative of formula I comprises, consists essentially of, consists of a carboxylate group.

The redox flow battery electrolyte of any previous paragraph, wherein the substituent Y of the DMTD derivative of formula I comprises, consists essentially of, consists of a mono-carboxylate group.

The redox flow battery electrolyte of any previous paragraph, wherein the substituent Y of the DMTD derivative of formula I comprises, consists essentially of, consists of a di-carboxylate group.

The DMTD derivative of any previous paragraph, wherein the carboxylate comprises, consists essentially of, consists of a tri-carboxylate.

The redox flow battery electrolyte of any previous paragraph, wherein the substituent Y of the DMTD derivative of formula I comprises, consists essentially of, consists of an itaconate group.

The redox flow battery electrolyte of any previous paragraph, wherein the substituent Y of the DMTD derivative of formula I comprises, consists essentially of, consists of a maleate group.

The redox flow battery electrolyte of any previous paragraph, wherein the substituent Y of the DMTD derivative of formula I comprises, consists essentially of, consists of a citraconate group.

The redox flow battery electrolyte of any previous paragraph, wherein the substituent Y of the DMTD derivative of formula I comprises, consists essentially of, consists of a fumarate group.

The redox flow battery electrolyte of any previous paragraph, wherein the substituent Y of the DMTD derivative of formula I comprises, consists essentially of, consists of a mesaconate group.

The redox flow battery electrolyte of any previous paragraph, wherein the substituent Y of the DMTD derivative of formula I comprises, consists essentially of, consists of a (meth)acrylate group.

The redox flow battery electrolyte of any previous paragraph, wherein the substituent Y of the DMTD derivative of formula I comprises, consists essentially of, consists of "$CH_2CH[CH_3$ or $H]C(O)OZ$," where "Z" can be H, X, "R," $RN^+(R)_3SO_3^-$, $RN^+(R)_3SO_3^-K^+$, "$RSO_3^-Na^+$," $RSO_3^-NH_4^+$, "$ROS_3H$," or "$RN^+(R)_3Cl^-$."

The redox flow battery electrolyte of any previous paragraph, wherein the DMTD derivative comprises, consists essentially of, consists of the reaction product of DMTD and a carboxamide group.

The redox flow battery electrolyte of any previous paragraph, wherein the substituent Y of the DMTD derivative of formula I comprises, consists essentially of, consists of a carboxamide group.

The redox flow battery electrolyte of any previous paragraph, wherein the substituent Y of the DMTD derivative of formula I comprises, consists essentially of, consists of a mono-carboxamide group.

The redox flow battery electrolyte of any previous paragraph, wherein the substituent Y of the DMTD derivative of formula I comprises, consists essentially of, consists of a di-carboxamide group.

The redox flow battery electrolyte of any previous paragraph, wherein the substituent Y of the DMTD derivative of formula I comprises, consists essentially of, consists of a primary carboxamide group.

The redox flow battery electrolyte of any previous paragraph, wherein the substituent Y of the DMTD derivative of formula I comprises, consists essentially of, consists of a secondary carboxamide group.

The redox flow battery electrolyte of any previous paragraph, wherein the substituent Y of the DMTD derivative of formula I comprises, consists essentially of, consists of a tertiary carboxamide group.

The redox flow battery electrolyte of any previous paragraph, wherein the substituent Y of the DMTD derivative of formula I comprises, consists essentially of, consists of an itaconic amide group.

The redox flow battery electrolyte of any previous paragraph, wherein the substituent Y of the DMTD derivative of formula I comprises, consists essentially of, consists of a maleic amide group.

The redox flow battery electrolyte of any previous paragraph, wherein the substituent Y of the DMTD derivative of formula I comprises, consists essentially of, consists of a citraconic amide group.

The redox flow battery electrolyte of any previous paragraph, wherein the substituent Y of the DMTD derivative of formula I comprises, consists essentially of, consists of a fumaric amide group.

The redox flow battery electrolyte of any previous paragraph, wherein the substituent Y of the DMTD derivative of formula I comprises, consists essentially of, consists of a mesaconic amide group.

The redox flow battery electrolyte of any previous paragraph, wherein the substituent Y of the DMTD derivative of formula I comprises, consists essentially of, consists of a (meth)acrylamide group.

The redox flow battery electrolyte of any previous paragraph, wherein the substituent Y of the DMTD derivative of formula I comprises, consists essentially of, consists of "CH$_2$CH[CH$_3$ or H]C(O)NHZ," where "Z" can be H, "R," "RSO$_3^-$Na$^+$," "RSO$_3$H," or "RN$^+$(R)$_3$Cl$^-$."

The redox flow battery electrolyte of any previous paragraph, wherein the DMTD derivative comprises, consists essentially of, consists of a compound of formula IX

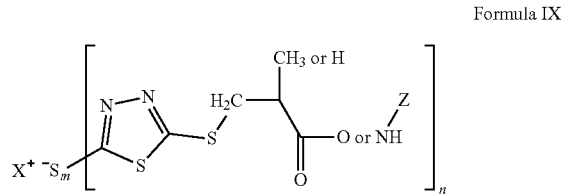

Formula IX where X, m, and n are as set forth for Formula I, and "Z" is H, X, "R," RSO$_3^-$Na$^+$, RSO$_3$H, RN$^+$(R)$_3$SO$_3^-$, RN$^+$(R)$_3$SO$_3^-$K$^+$, RSO$_3^-$NH$_4^+$ or RN$^+$(R)$_3$Cl$^-$.

The redox flow battery electrolyte of any previous paragraph, wherein the DMTD derivative comprises, consists essentially of, consists of the reaction product of DMTD and a halogenated alcohol ("halo-alcohol") group.

The redox flow battery electrolyte of any previous paragraph, wherein the DMTD derivative comprises, consists essentially of, consists of the reaction product of DMTD and an epoxide group.

The redox flow battery electrolyte of any previous paragraph, wherein the substituent Y of the DMTD derivative of formula I comprises, consists essentially of, consists of "R[OH]$_p$A," where "p" is an integer from 1 to 6 and "A" is H or an amine, such as a trialkyl amine or a quaternary amine salt.

The redox flow battery electrolyte of any previous paragraph, wherein the DMTD derivative comprises, consists essentially of, consists of a compound of formula VIII:

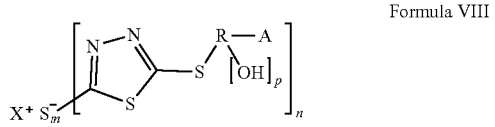

Formula VIII where X, R, m, and n are as set forth for Formula I, and "p" is an integer from 1 to 6 and "A" is H or an amine, such as a trialkyl amine or a quaternary amine salt.

The redox flow battery electrolyte of any previous paragraph, wherein the alcohol group (i.e., the R[OH]$_p$A group) comprises, consists essentially of, consists of propanol.

The redox flow battery electrolyte of any previous paragraph, wherein the alcohol group (i.e., the R[OH]$_p$A group) comprises, consists essentially of, consists of hexanol.

The redox flow battery electrolyte of any previous paragraph, wherein the alcohol group (i.e., the R[OH]$_p$A group) comprises, consists essentially of, consists of butanol.

The redox flow battery electrolyte of any previous paragraph, wherein the alcohol group (i.e., the R[OH]$_p$A group) comprises, consists essentially of, consists of phenyl propanol.

The redox flow battery electrolyte of any previous paragraph, wherein the alcohol group (i.e., the R[OH]$_p$A group) comprises, consists essentially of, consists of a sugar alcohol.

The redox flow battery electrolyte of any previous paragraph, wherein the alcohol group (i.e., the R[OH]$_p$A group) comprises, consists essentially of, consists of a polyvinyl alcohol.

The redox flow battery electrolyte of any previous paragraph, wherein the alcohol group (i.e., the R[OH]$_p$A group) comprises, consists essentially of, consists of ethylene glycol.

The redox flow battery electrolyte of any previous paragraph, wherein the alcohol group (i.e., the R[OH]$_p$A group) comprises, consists essentially of, consists of propylene glycol.

The redox flow battery electrolyte of any previous paragraph, wherein the alcohol group (i.e., the R[OH]$_p$A group) comprises, consists essentially of, consists of butanediol.

The redox flow battery electrolyte of any previous paragraph, wherein the alcohol group (i.e., the R[OH]$_p$A group) comprises, consists essentially of, consists of glycerol.

The redox flow battery electrolyte of any previous paragraph, wherein the alcohol group (i.e., the R[OH]$_p$A group) comprises, consists essentially of, consists of ethanolamine.

The redox flow battery electrolyte of any previous paragraph, wherein the alcohol group (i.e., the R[OH]$_p$A group) comprises, consists essentially of, consists of propanolamine.

The redox flow battery electrolyte of any previous paragraph, wherein the alcohol group (i.e., the R[OH]$_p$A group) comprises, consists essentially of, consists of propanol dimethylamine.

The redox flow battery electrolyte of any previous paragraph, wherein the alcohol group (i.e., the R[OH]$_p$A group) comprises, consists essentially of, consists of a propanol quaternary amine halide salt.

The redox flow battery electrolyte of any previous paragraph, wherein the DMTD derivative is further reacted with a base.

The redox flow battery electrolyte of any previous paragraph, wherein the base comprises, consists essentially of, consists of an alkali or alkaline earth metal, a trialkyl amine, a quaternary amine, or combinations thereof.

The redox flow battery electrolyte of any previous paragraph, wherein the base comprises, consists essentially of, consists of, consists essentially of, or consists of Li.

The redox flow battery electrolyte of any previous paragraph, wherein the base comprises, consists essentially of, consists of, consists essentially of, or consists of Na.

The redox flow battery electrolyte of any previous paragraph, wherein the base comprises, consists essentially of, consists of, consists essentially of, or consists of K.

The redox flow battery electrolyte of any previous paragraph, wherein the base comprises, consists essentially of, consists of, consists essentially of, or consists of Mg.

The redox flow battery electrolyte of any previous paragraph, wherein the base comprises, consists essentially of, consists of, consists essentially of, or consists of Ca.

The redox flow battery electrolyte of any previous paragraph, wherein the DMTD derivative is further reacted with an oxidizing reagent.

The redox flow battery electrolyte of any previous paragraph, wherein the DMTD derivative is further reacted with hydrogen peroxide.

The redox flow battery electrolyte of any previous paragraph, wherein n in formula I is 2 and m in formula I is 1, 2 or 3 to provide a coupled compound of any of formulas III, IV and V:

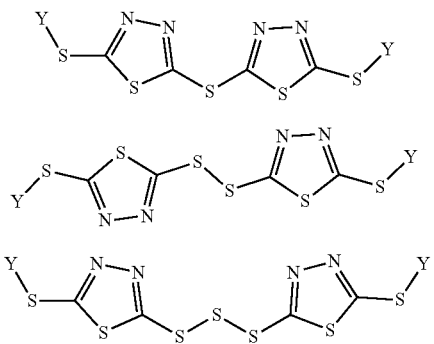

Formula III

Formula IV

Formula V

The redox flow battery electrolyte of any previous paragraph, wherein the DMTD or derivative thereof is present at from about 1 to about 50 wt. %.

The redox flow battery electrolyte of any previous paragraph, wherein the DMTD or derivative thereof is present at from about 2.5 to about 30 wt. %.

The redox flow battery electrolyte of any previous paragraph, wherein the DMTD or derivative thereof is present at from about 5 to about 25 wt. %.

The redox flow battery electrolyte of any previous paragraph, wherein the DMTD or derivative thereof is present at from about 10 to about 20 wt. %.

The redox flow battery electrolyte of any previous paragraph, further comprising, consisting essentially of, consisting of a supporting electrolyte.

The redox flow battery of any previous paragraph, wherein the supporting electrolyte is present at from about 0.1 to about 20 wt. %.

The redox flow battery of any previous paragraph, wherein the supporting electrolyte is present at from about 0.25 to about 15 wt. %.

The redox flow battery of any previous paragraph, wherein the supporting electrolyte is present at from about 0.5 to about 10 wt. %.

The redox flow battery electrolyte of either of any previous paragraph, wherein the supporting electrolyte comprises, consists essentially of, consists of at least one of lithium, sodium, potassium, or mixtures thereof.

The redox flow battery electrolyte of either of any previous paragraph, wherein the supporting electrolyte comprises, consists essentially of, consists of sodium phosphate.

The redox flow battery electrolyte of either of any previous paragraph, wherein the supporting electrolyte comprises, consists essentially of, consists of sodium chloride.

The redox flow battery electrolyte of either of any previous paragraph, wherein the supporting electrolyte comprises, consists essentially of, consists of potassium phosphate.

The redox flow battery electrolyte of either of any previous paragraph, wherein the supporting electrolyte comprises, consists essentially of, consists of potassium chloride.

The redox flow battery electrolyte of either of any previous paragraph, wherein the supporting electrolyte comprises, consists essentially of, consists of potassium hexafluorophosphate.

The redox flow battery electrolyte of either of any previous paragraph, wherein the supporting electrolyte comprises, consists essentially of, consists of lithium hexafluorophosphate.

The redox flow battery electrolyte of either of any previous paragraph, wherein the supporting electrolyte comprises, consists essentially of, consists of tetrabutylammonium fluorophosphate.

The redox flow battery electrolyte of either of any previous paragraph, wherein the supporting electrolyte comprises, consists essentially of, consists of tetrabutylammonium chloride.

The redox flow battery electrolyte of either of any previous paragraph, wherein the supporting electrolyte comprises, consists essentially of, consists of lithium perchlorate.

The redox flow battery electrolyte of either of any previous paragraph, wherein the supporting electrolyte comprises, consists essentially of, consists of lithium nitrate.

A redox flow battery system comprising, consisting essentially of, consisting of an electrolyte according to any previous paragraph, wherein during the charging state the electrolyte forms A) an anolyte comprising, consisting essentially of, consisting of RSSR, 2RS$^-$, or a mixture thereof in a polar solvent, and B) a catholyte comprising, consisting essentially of, consisting of RSSR or 2S$^-$, or a mixture thereof in a polar solvent.

The redox flow battery system of any previous paragraph further comprising, consisting essentially of, consisting of an ion exchange membrane or microporous membrane.

The redox flow battery system of any previous paragraph further comprising, consisting essentially of, consisting of where the membrane comprises, consists essentially of, consists of a sulfonated tetrafluouroethylene based fluoropolymer-copolymer.

The redox flow battery system of any previous paragraph where the membrane comprises, consists essentially of, consists of a cellulose-based dialysis membrane.

The redox flow battery system of any previous paragraph where the membrane comprises, consists essentially of, consists of functionalized polystyrene blended with polyvinyl chloride.

What is claimed is:

1. A redox flow battery electrolyte comprising A) a polar solvent, and B) from about 1 to about 50 wt.% 2,5-dimercapto-1,3,4-thiadiazole derivatives represented by formula I:

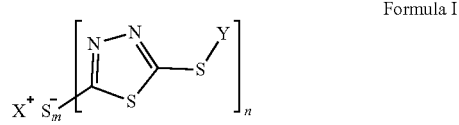

Formula I where
each "X," individually, is an alkali or alkaline earth metal, a trialkyl amine, or a quaternary amine, or H;
"m" is 1, 2 or 3, and
"n" is 1 or 2; and
where "Y" is:

"R," a linear, branched, saturated or unsaturated, or cyclic $C_1$ to $C_{12}$ alkyl or aryl group;

"$[RO]_oR$," where "o" is an integer from 1 to 100;

"$R[OH]_pA$," where "p" is an integer from 1 to 6 and "A" is H or an amine;

or a carboxylate or carboxamide group, wherein, when n is 2, X is absent.

2. The redox flow battery electrolyte of claim 1, wherein the polar solvent comprises water.

3. The redox flow battery electrolyte of claim 1, wherein the polar solvent comprises acetonitrile.

4. The redox flow battery electrolyte of claim 1, wherein the polar solvent comprises an organic solvent.

5. The redox flow battery electrolyte of claim 1, wherein the electrolyte comprises a 2,5-dimercapto-1,3,4-thiadiazole derivative.

6. The redox flow battery of claim 5, wherein the 2,5-dimercapto-1,3,4-thiadiazole derivative is selected from the group consisting of mono-alkylated derivatives, etherified derivatives, alcohol derivatives, carboxylate derivatives, and carboxamide derivatives.

7. The redox flow battery electrolyte of claim 1, further comprising a supporting electrolyte.

8. The redox flow battery of claim 7, wherein the supporting electrolyte is present at from about 0.1 to about 20 wt.%.

9. The redox flow battery electrolyte of claim 7, wherein the supporting electrolyte is at least one of lithium, sodium, potassium, or mixtures thereof.

10. A redox flow battery system comprising an electrolyte according to claim 1, wherein during the charging state the electrolyte forms A) an anolyte comprising RSSR, 2RS$^-$, or a mixture thereof in a polar solvent, and B) a catholyte comprising RSSR or 2S$^-$, or a mixture thereof in a polar solvent.

11. The redox flow battery system of claim 10 further comprising an ion exchange membrane or microporous membrane.

12. The redox flow battery system of claim 10 further comprising where the membrane is a sulfonated tetrafluoroethylene based fluoropolymer-copolymer.

13. The redox flow battery system of claim 10 where the membrane is a cellulose-based dialysis membrane.

14. The redox flow battery system of claim 10 where the membrane comprises functionalized polystyrene blended with polyvinyl chloride.

* * * * *